United States Patent
St-Arnaud et al.

(10) Patent No.: US 11,110,958 B2
(45) Date of Patent: Sep. 7, 2021

(54) STEERABLE TRACK SYSTEM FOR VEHICLES

(71) Applicant: SOUCY INTERNATIONAL INC., Drummondville (CA)

(72) Inventors: Charles St-Arnaud, Trois-Rivieres (CA); Pascal Lafreniere, St-Cyrille-de-Wendover (CA); Steve Frechette, St-Liboire (CA); Frederik Martel, Laval (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 254 days.

(21) Appl. No.: 16/319,530

(22) PCT Filed: Jul. 24, 2017

(86) PCT No.: PCT/US2017/043532
§ 371 (c)(1),
(2) Date: Jan. 22, 2019

(87) PCT Pub. No.: WO2018/018045
PCT Pub. Date: Jan. 25, 2018

(65) Prior Publication Data
US 2020/0207413 A1    Jul. 2, 2020

Related U.S. Application Data

(60) Provisional application No. 62/365,707, filed on Jul. 22, 2016.

(51) Int. Cl.
*B62D 11/20*    (2006.01)
*B62D 11/00*    (2006.01)
(Continued)

(52) U.S. Cl.
CPC .......... *B62D 11/20* (2013.01); *B62D 11/003* (2013.01); *B62D 11/005* (2013.01); *B62D 55/04* (2013.01);
(Continued)

(58) Field of Classification Search
CPC .......... F16H 1/20; B62D 55/14; B62D 55/12; B62D 55/10; B62D 55/084; B62D 55/065;
(Continued)

(56) References Cited

U.S. PATENT DOCUMENTS 1,238,762 A * 9/1917 Hapeman ............... B62D 55/04
180/9.26
1,454,911 A * 5/1923 Stephenson ............ B62D 55/04
180/9.26
(Continued)

FOREIGN PATENT DOCUMENTS

| EP | 0680869 | A2 | 11/1995 |
| EP | 2360085 | A1 | 8/2011 |
| WO | 2003047953 | A2 | 6/2003 |

OTHER PUBLICATIONS

International Search Report from PCT/US2017/043532, dated Oct. 12, 2017, Szaip, Andras.

*Primary Examiner* — Kevin Hurley
*Assistant Examiner* — Hosam Shabara
(74) *Attorney, Agent, or Firm* — BCF LLP

(57) ABSTRACT

A steerable track system usable with a vehicle that has a chassis, an axle frame extending laterally outwardly from the chassis and having an attachment portion at an end thereof to which the steerable track system is connectable, and a driven shaft extending laterally outwardly from the chassis suitable for driving the steerable track system. The steerable track system has a frame having a cavity defined therein and being operatively connectable to the axle frame
(Continued)

so as to be pivotable about a steering axis for steering the track system, and a gear train with components disposed in the cavity. The gear train transmits driving forces from the driven shaft to a driven wheel assembly of a plurality of track-supporting wheel assemblies. An endless track extends around the track-supporting wheel assemblies and is drivable by the driven wheel assembly.

21 Claims, 20 Drawing Sheets

(51) Int. Cl.
    *B62D 55/04*          (2006.01)
    *B62D 55/084*        (2006.01)
    *B62D 55/10*          (2006.01)
    *F16H 1/20*           (2006.01)
    *B62D 55/12*          (2006.01)
    *B62D 55/14*          (2006.01)

(52) U.S. Cl.
    CPC ........... *B62D 55/084* (2013.01); *B62D 55/10* (2013.01); *F16H 1/20* (2013.01); *B62D 55/12* (2013.01); *B62D 55/14* (2013.01)

(58) Field of Classification Search
    CPC .... B62D 55/04; B62D 11/005; B62D 11/003; B62D 11/20
    USPC .............................. 180/9.46, 24.05
    See application file for complete search history.

(56) References Cited

U.S. PATENT DOCUMENTS

| | | | |
|---|---|---|---|
| 6,175,334 B1 | 1/2001 | Lorenzen et al. | |
| 6,176,334 B1 * | 1/2001 | Lorenzen | B62D 21/14 180/9.46 |
| 6,810,975 B2 * | 11/2004 | Nagorcka | B62D 55/0842 180/9.5 |
| 8,042,629 B2 * | 10/2011 | Mackenzie | B62D 55/04 180/9.21 |
| 2002/0023788 A1 * | 2/2002 | Torrie | B62D 55/065 180/9.26 |
| 2005/0035650 A1 * | 2/2005 | Toews | B62D 49/0635 301/1 |
| 2005/0060918 A1 * | 3/2005 | Inaoka | B62D 55/14 37/347 |
| 2005/0077094 A1 | 4/2005 | Jordan | |
| 2010/0219004 A1 * | 9/2010 | Mackenzie | B62D 55/10 180/9.21 |
| 2013/0187443 A1 * | 7/2013 | Zakuskin | B62D 55/04 305/120 |
| 2017/0158267 A1 | 6/2017 | Boivin | |
| 2017/0197675 A1 | 7/2017 | Alidan | |

* cited by examiner

STEERABLE TRACK SYSTEM FOR VEHICLES

CROSS-REFERENCE TO RELATED APPLICATIONS

The present application claims priority to U.S. Provisional Patent Application Ser. No. 62/365,707, filed Jul. 22, 2016, entitled "Steerable track system", which is incorporated by reference herein in its entirety.

TECHNICAL FIELD

The present technology relates to steerable track systems for vehicles.

BACKGROUND

Certain vehicles, such as agricultural vehicles (e.g., harvesters, combines, tractors, agricultural implements, etc.) and construction vehicles (e.g., bulldozers, front-end loaders, etc.) for example, are used to perform work on ground surfaces that are soft, slippery and/or uneven (e.g., on soil, mud, sand, ice, snow, etc.).

Conventionally, such vehicles have had large wheels with tires on them to move the vehicle along the ground surface. Under certain conditions, such tires may have poor traction on some specific types of ground surface and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. In order to reduce the aforementioned drawbacks, to increase traction and to distribute the weight of the vehicle over a larger area on the ground surface, track systems were developed to be used in place of at least some of the wheel and tire assemblies on the vehicles.

Such conventional track systems designed for agricultural vehicles typically have a frame supported (at least indirectly) by the vehicle's chassis, a drive sprocket rotatably supported on the frame and operatively connected to the engine of the vehicle to drive an endless track, leading and trailing track-supporting wheel assemblies rotatably supported at each end of the frame and roller wheel assemblies rotatably supported by the frame between the track-supporting wheels assemblies.

One characteristic of such conventional track systems is that the vehicle's axle frame and the track system's drive sprocket are coaxial. As a result, the vehicle is generally higher off the ground than it would be when it is equipped with its original wheel/tire assemblies. In some situations, this additional height may not be desirable.

Another characteristic of such conventional track systems is that, in order to provide the vehicle with a particular desired ground speed, the drive sprocket is made relatively large. Consequently, such conventional track systems are sometimes not suitable for smaller vehicles, due to the vehicle frame clearance limitations of such vehicles. In some cases, relatively small vehicles require relatively difficult and/or costly modifications in order to receive such conventional track systems. Other inconveniences also exist with prior art track systems. Although prior art systems are suitable for their intended purpose, they have certain drawbacks. Therefore, improvements are possible.

SUMMARY

It is therefore an object of the present technology to ameliorate at least one of the inconveniences present in the prior art.

It is also an object of the present invention to provide a steerable track system for vehicle, which is improved in at least some instances as compared with some of the prior art.

In the present specification, the terms "outwardly" and "outward" mean in a direction away from a vertical plane containing the longitudinal centerline 70 (FIG. 2B) of the chassis 62 of the vehicle 60. The terms "inwardly" and "inward" mean in a direction toward a vertical plane containing the longitudinal centerline 70. The term "longitudinally" means in a direction parallel a vertical plane containing the longitudinal centerline 70. The term "transversally" means in a direction perpendicular to a vertical plane containing the longitudinal centerline 70. The term "vertically" means in a direction perpendicular to a horizontal plane containing the longitudinal centerline 70; e.g., along a height direction of the steerable track system 40 when disposed on a flat level ground surface. A direction of forward travel of the steerable track system 40 is indicated by an arrow 80 (FIGS. 1, 2A and 3).

According to an aspect of the present technology, there is provided a steerable track system for use with agricultural vehicles, or other vehicles. In one particular application, the steerable track system replaces the front wheels of a vehicle, which front wheels are steerable. In one aspect, the structure of the steerable track system permits the steerable track system to be fitted onto relatively small vehicles, such as tractors typically used on vineyards, despite clearance limitations of the vehicle frame and fairings of such vehicles.

In yet a further aspect, the structure of the steerable track system permits the steerable track system to be fitted onto such vehicles without materially raising the ride height of such vehicles. In some cases, the structure of the steerable track system reduces the weight of the steerable track system while maintaining structural strength of the steerable track system. More particularly, in those cases the combination of a frame with a cavity defined therein, and a gear train positioned inside the cavity reduces the weight of the steerable track system while maintaining structural strength of the steerable track system. In some cases, the structure of the steerable track system provides reduced maintenance requirements of the gear train of the steerable track system.

In some applications, the steerable track system can be fitted onto relatively smaller vehicles, such as tractors typically used on vineyards, while maintaining the top ground speed capability of those vehicles and while requiring relatively few modifications to the vehicles. In other applications, the steerable track system can be fitted onto relatively smaller vehicles, such as tractors typically used on vineyards, while providing the top ground speed capability of those vehicles within 30% (inclusive) of the original top ground speed capability and while requiring relatively few modifications to the vehicles.

In this description, the original top ground speed capability of a vehicle is the top ground speed capability of the vehicle before any of the original wheels of the vehicle are replaced with the steerable track system of the present technology.

According to another aspect of the present technology, there is provided a steerable track system for use with a vehicle having a chassis, an axle frame extending laterally outwardly from the chassis and having an attachment portion at an end thereof to which the steerable track system is connectable, and a driven shaft extending laterally outwardly from the chassis suitable for driving the steerable track system.

The steerable track system has a frame with a cavity defined therein. The frame is operatively connectable to the axle frame so as to be pivotable about a steering axis for steering the track system. The steerable track system also has a gear train. The gear train includes a plurality of gears. The plurality of gears includes an input gear mounted on an input shaft rotatable about an input gear axis, and an output gear mounted on an output shaft rotatable about an output gear axis. The input and output gears are disposed within the cavity, and the input gear is operatively connected to the output gear to drive the output gear. The input shaft is operatively connectable to the driven shaft of the vehicle.

The steerable track system also has a plurality of track-supporting wheel assemblies rotatably mounted to the frame. The plurality of track-supporting wheel assemblies include a driven wheel assembly. The driven wheel assembly is operatively connected to the output shaft. An endless track extends around the plurality of track-supporting wheel assemblies and is drivable by the driven wheel assembly.

In some embodiments, the frame of the steerable track system is operatively connectable to the axle frame of the vehicle so as to be pivotable about a frame pivot axis to allow for changes in a pitch of the track system when the track system is connected to the vehicle.

In some embodiments, the steerable track system includes a steering knuckle connectable to tie rods of the vehicle, and the frame of the steerable track system is operatively connectable to the axle frame via the steering knuckle.

In some embodiments, the steerable track system further includes a powertrain assembly. The powertrain assembly includes the driven shaft, the input shaft, and at least one constant velocity joint assembly operatively connected therebetween. The steering knuckle has a passageway defined therein, and the powertrain assembly extends at least partially within the passageway in the steering knuckle. The passageway is dimensioned to allow pivotal motion of the steering knuckle about the knuckle pivot axis notwithstanding a presence of the powertrain assembly extending therethrough.

In some embodiments, the plurality of track-supporting wheel axes lie in a first horizontal plane extending below the frame pivot axis.

In some embodiments, when the steerable track system is connected to the vehicle, the frame pivot axis lies in a second horizontal plane extending below the axle frame of the vehicle.

In some embodiments, the steerable track system further includes a roller wheel assembly supported by the frame and the roller wheel assembly is disposed intermediate a leading track-supporting wheel assembly and a trailing track-supporting wheel assembly of the plurality of track-supporting wheel assemblies.

In some embodiments, the output gear has a first number of teeth and the input gear has a second number of teeth that is greater than the first number of teeth.

In some embodiments, the vehicle is designed to have a wheel assembly having a tire connected to the attachment portion of the axle frame, and the input gear, the output gear, and the driven wheel assembly are dimensioned such that, for a given driven shaft rotational speed, a ground speed of the track is within a predetermined percentage of the ground speed of the tire.

In some embodiments, the predetermined percentage is between 0% and 30% inclusive (in other words, the ground speed of the track is between 70% and 100% of the tire speed at the given driven shaft rotational speed).

In some embodiments, the frame has a removable panel for accessing the gear train inside the cavity of the frame.

In some embodiments, the input gear axis is coaxial with the frame pivot axis, the output gear axis is coaxial with a trailing track-supporting wheel axis, and the input and output gears are coplanar in a vertical plane parallel to a longitudinal centerline of the frame.

In some embodiments, the vertical plane includes the longitudinal centerline of the frame.

In some embodiments, the endless track is at least in part frictionally driven by the driven wheel assembly.

In some embodiments, the steerable track system further includes a stop extending laterally from the frame, and the stop is structured and arranged to limit pivotal movement of the frame about the frame pivot axis.

In some embodiments, the endless track has an obround travel path around the plurality of track-supporting wheel assemblies.

In some embodiments, the gear train consists essentially of: the plurality of gears, the input shaft and the output shaft.

In some embodiments, an entirety of the gear train is below a plane tangential to an uppermost point of each surface of two of the plurality of track-supporting wheel assemblies.

In some embodiments, the entirety of the frame is below the tangential plane.

In some embodiments, the two track-supporting wheel assemblies have a same wheel diameter and are the leading and trailing track-supporting wheel assemblies.

According to an aspect of the present technology, there is provided a steerable track system for use with a vehicle having a chassis, a power source mounted to the chassis suitable for driving the steerable track system, and an axle frame extending laterally outwardly from the chassis and having an attachment portion at an end thereof to which the steerable track system is connectable.

The steerable track system has a frame that is operatively connectable to the attachment portion so as to be pivotable about a steering axis for steering the track system. A motor is supported by the frame and is operatively connectable to the power source of the vehicle. The motor has an output shaft. A plurality of track-supporting wheel assemblies is supported by the frame. Each one of the plurality of track-supporting wheel assemblies has a track-supporting wheel axle about which that one of the plurality of track-supporting wheel assemblies rotates. At least one the track-supporting wheel assemblies is operatively connected to the output shaft of the motor to be driven by the motor. An endless track extends around the plurality of track-supporting wheel assemblies.

In some embodiments, the power source is an electrical power source and the motor is an electric motor.

In some embodiments, the power source is a hydraulic system and the motor is a hydraulic motor.

In some embodiments, the frame has a cavity defined therein and the cavity houses the motor therein.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

Figure 1:
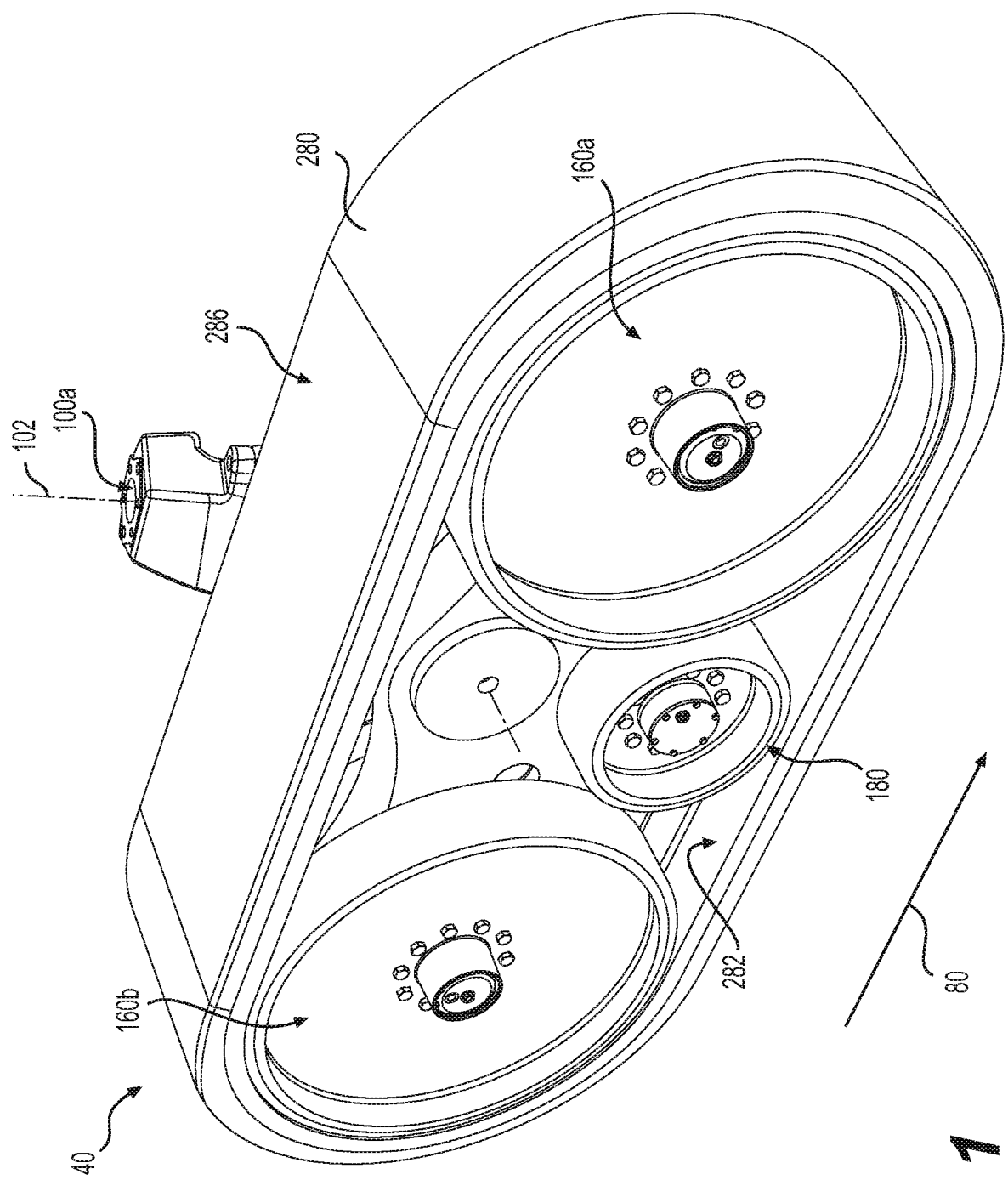
FIG. 1 is a perspective view taken from a top, front, right side of a front right steerable track system for a vehicle.

With reference to FIGS. 1 to 11, a first embodiment of the present technology, steerable track systems 40 and 40', are provided for use with a vehicle 60.

The steerable track systems 40, 40' are shown being connected to the vehicle 60 having replaced the front wheels of the vehicle 60 (which the vehicle has been designed for and supplied with from its manufacturer). It is also contemplated that steerable track systems being other embodiments of the present technology could be used to replace the steerable rear wheels of a vehicle, either in addition to or instead of steerable track systems of the present technology replacing the front wheels of that vehicle. In a non-limiting example, such a vehicle could have been designed such that the rear wheels are steerable in a opposite to that the front wheels.

It should be understood that the steerable track system 40 is merely an embodiment of the present technology. Thus, the description thereof that follows is intended to be only a description of illustrative examples of the present technology. This description is not intended to define the scope or set forth the bounds of the present technology.

Examples of modifications or alternatives to the steerable track system 40 are described below. This is done merely as an aid to understanding, and, again, not to define the scope or set forth the bounds of the present technology. These modifications are not an exhaustive list, and, as a person skilled in the art would understand, other modifications are likely possible.

Further, where this has not been done (i.e. where no examples of modifications have been set forth), it should not be interpreted that no modifications are possible and/or that what is described is the sole manner of implementing or embodying that element of the present technology.

In addition, it is to be understood that the steerable track system 40 may provide in certain aspects a simple embodiment of the present technology, and that where such is the case it has been presented in this manner as an aid to understanding. As persons skilled in the art would understand, various embodiments of the present technology may be of a greater complexity than what is described herein.

The steerable track system 40 is for use with a vehicle 60 (shown in FIGS. 2A to 2D) having a chassis 62 and an axle frame 64 extending laterally outwardly from the chassis 62. The chassis 62 supports the components of the vehicle 60, such as the cabin, the engine 60a (FIG. 2A), and other drivetrain components (not shown).

Figure 3:
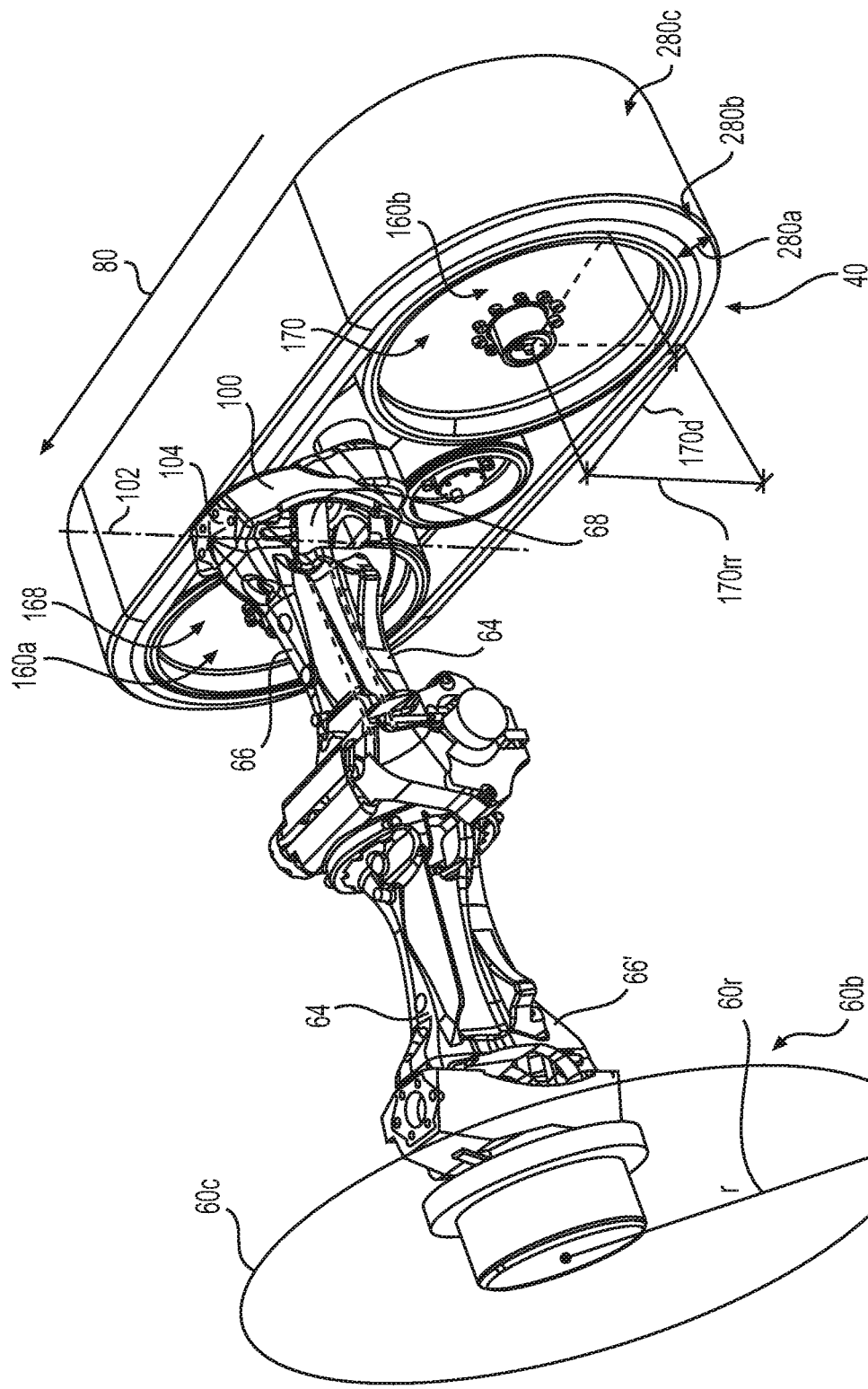
FIG. 3 is a perspective view taken from a top, rear, left side of the front right steerable track system of FIG. 2A.

Vehicle 60 was designed to have a left wheel assembly 60b having a tire 60c (shown schematically in FIG. 3) connected to the attachment portion 66 of the axle frame 64. As will be described in more detail below, the left wheel assembly 60b is a drivable steerable wheel assembly. The vehicle 60 was designed to also have a right drivable steerable wheel assembly, being a mirror image of the left wheel assembly 60b. Thus, a description of the left wheel assembly 60b corresponds to a description of the right wheel assembly, mutatis mutandis. In FIG. 3, the right wheel assembly has been replaced by the steerable track system 40.

Figure 2A:
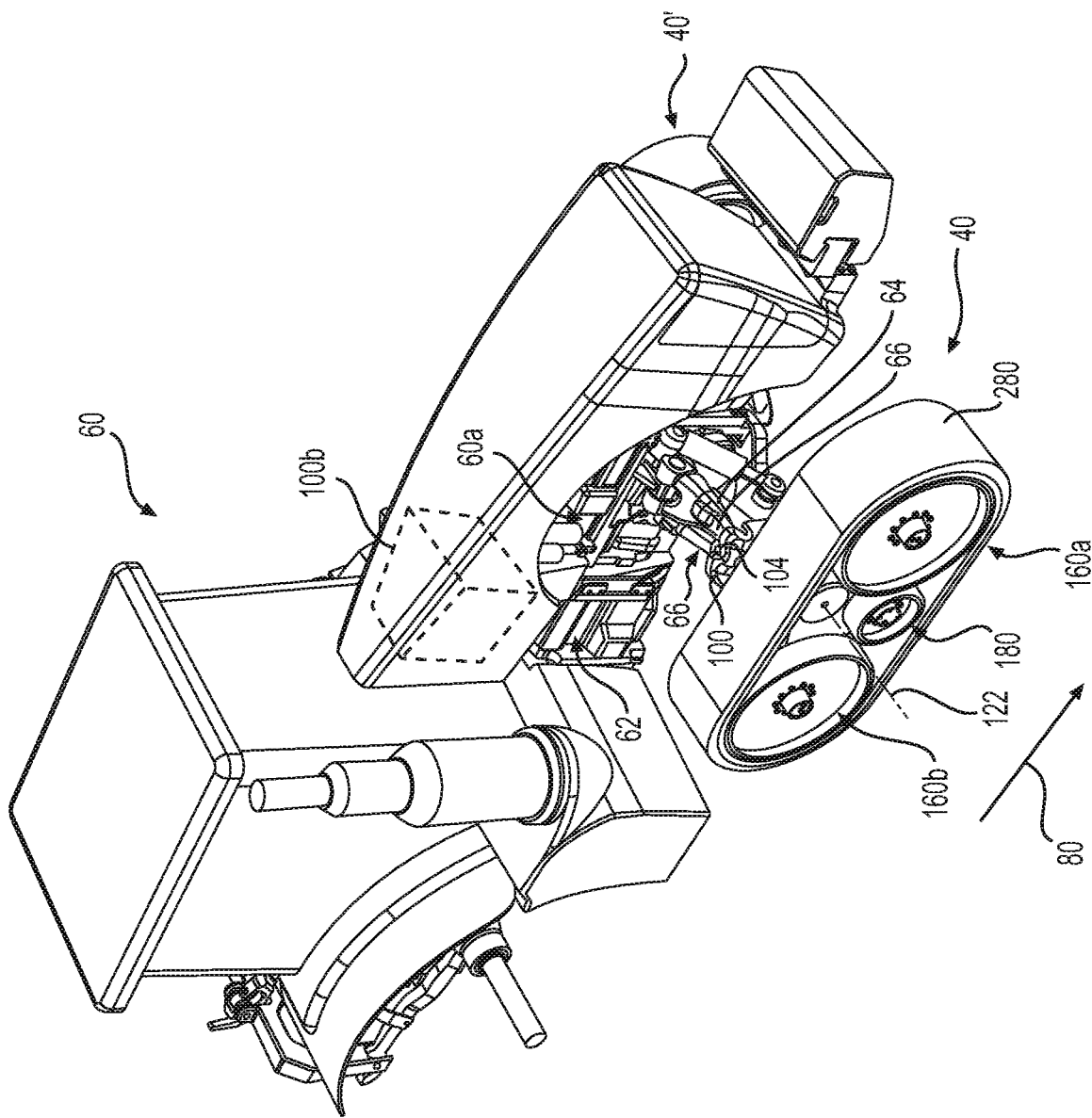
FIG. 2A is a perspective view taken from a front, top, right side of the front right steerable track system of FIG. 1, shown connected to a vehicle the rear wheels of which have been removed, the vehicle also having a front left steerable track system.
Figure 2B:
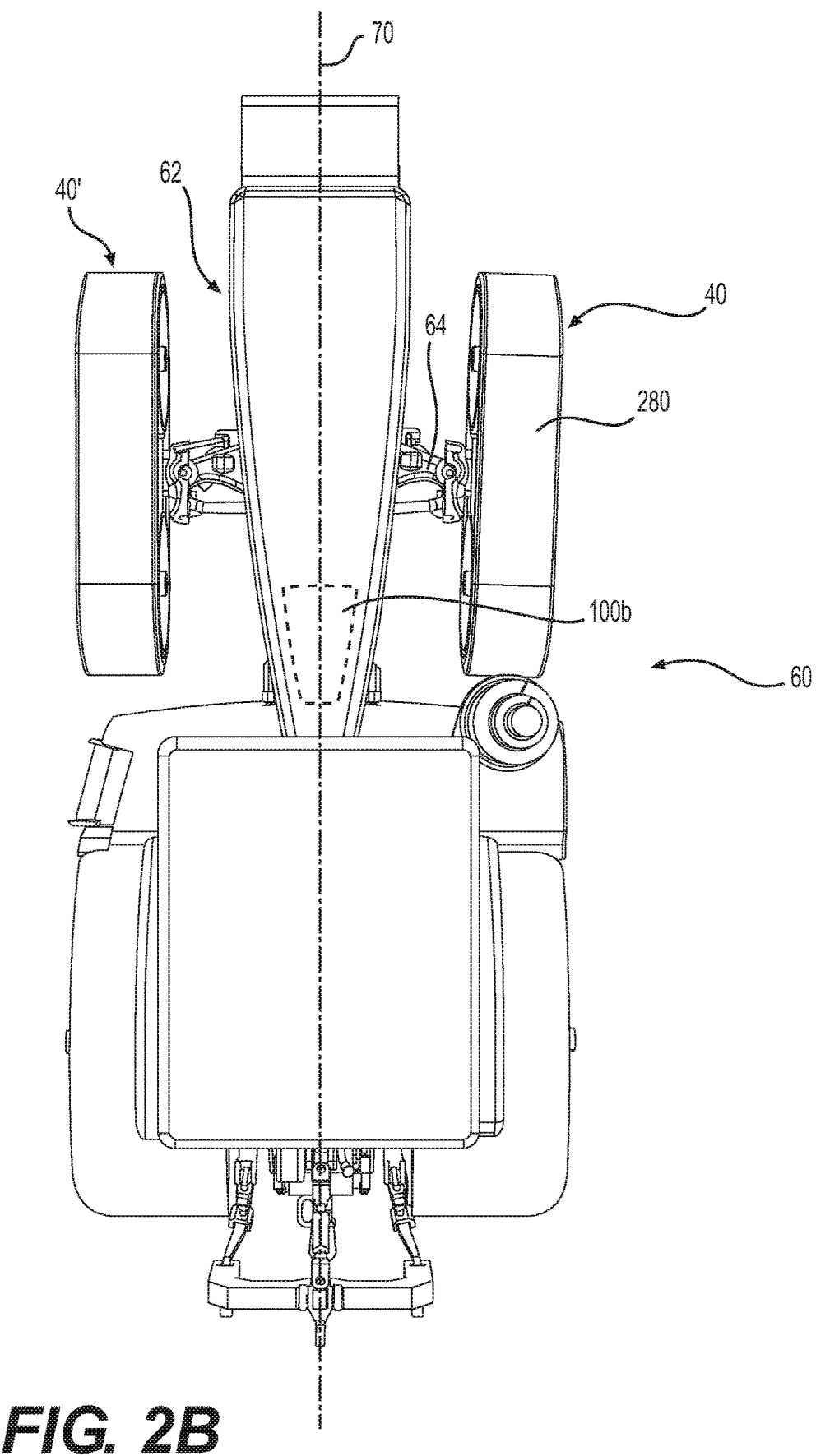
FIG. 2B is a top plan view of the vehicle of FIG. 2A.
Figure 2C:
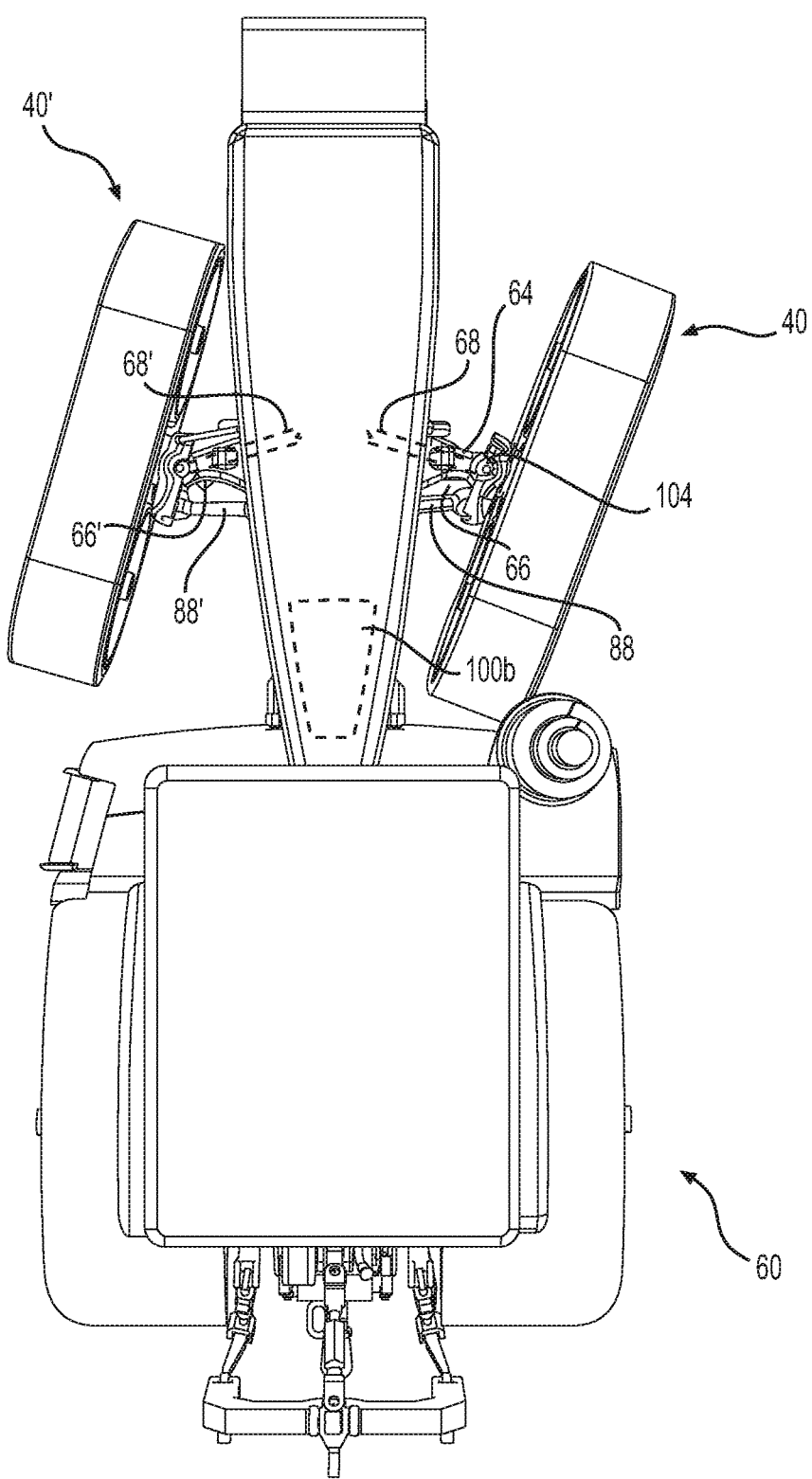
FIG. 2C is a top plan view of the vehicle of FIG. 2A, with the steerable track systems of the vehicle being in a rightward steering position.

As can be best seen in FIGS. 2C & 3, the axle frame 64 of the vehicle 60 has an attachment portion 66, 66' at each end thereof. The steerable track system 40 is connected to the attachment portion 66. The steerable track system 40' is connected to the attachment portion 66' (FIG. 2C).

The vehicle 60 is a four-wheel drive vehicle. Vehicle 60 has right and left driven front shafts 68, 68' (shown partially schematically in FIG. 2C) that are operatively connected to the engine 60a via a transmission (not shown) of the vehicle 60, which drive the steerable track systems 40. Right and left front driven shafts 68, 68' are mirror images of each other in this embodiment, and will not generally both be referred to in the remainder of the description for ease of reading.

Right driven front shaft 68 extends laterally outwardly from the chassis 62, from a front portion thereof. As best seen in FIG. 3, the driven shaft 68 extends through the axle frame 64, coaxial with the axle frame 64 in this embodiment. In other embodiments driven shaft 68 is not coaxial with the axle frame 64. In other embodiments driven shaft 68 is positioned outside of the axle frame 64.

The steerable track system 40 is attached to a right side of the axle frame 64 of the vehicle 60 and is operatively connected to the driven shaft 68 (as will be described in more detail below) to be driven by the driven shaft 68. A steerable track system 40' (FIGS. 2A to 2D) is attached to a left side of the axle frame 64, and is a mirror image of the steerable track system 40 in this embodiment.

General Description of the Steerable Track System

In the present embodiment, as best shown in FIG. 3, the steerable track system 40 includes a steering knuckle 100 connected to the axle frame 64 for steering the steerable track system 40. The steering knuckle 100 is sized and structured to support a portion of the weight of the vehicle 60 supported by the axle frame 64. In the present embodiment, the driven shaft 68 of the does not bear a material portion of the weight of the vehicle 60.

Referring now to FIGS. 1, 3, 7 and 9, the steering knuckle 100 is pivotably connected to the attachment portion 66 (FIG. 3) of the axle frame 64 of the vehicle 60 to pivot about a steering axis 102 to allow for steering of the track system 40. The steering axis 102 extends in a direction slightly off vertical, to provide a suitable effective castor of the steerable track system 40. This castor assists in increasing the stability of the vehicle 60. In other embodiments, the orientation of the steering axis 102 is different. The orientation may depend on the particular vehicle to which the steering system is designed to be attached.

In the present embodiment, the steering knuckle 100 is pivotably connected to the attachment portion 66 of the axle frame 64 via a kingpin assembly 104 (FIGS. 2C and 3). The kingpin assembly 104 extends through an aperture 100a (FIG. 9) defined in the steering knuckle 100. In other embodiments different connecting mechanisms are used. In other embodiments, the steerable track system is not pivotably connected to the attachment portion of an axle frame via a steering knuckle; the system is pivotably connected to the attachment portion 66 via a different mechanism, such as a ball joint.

In the present embodiment, the steering knuckle 100 is designed to replace a steering knuckle and wheel hub of the vehicle 60 with which the vehicle 60 was originally equipped. In other embodiments a vehicle 60 is designed to be manufactured with a steerable track system.

Figure 9:
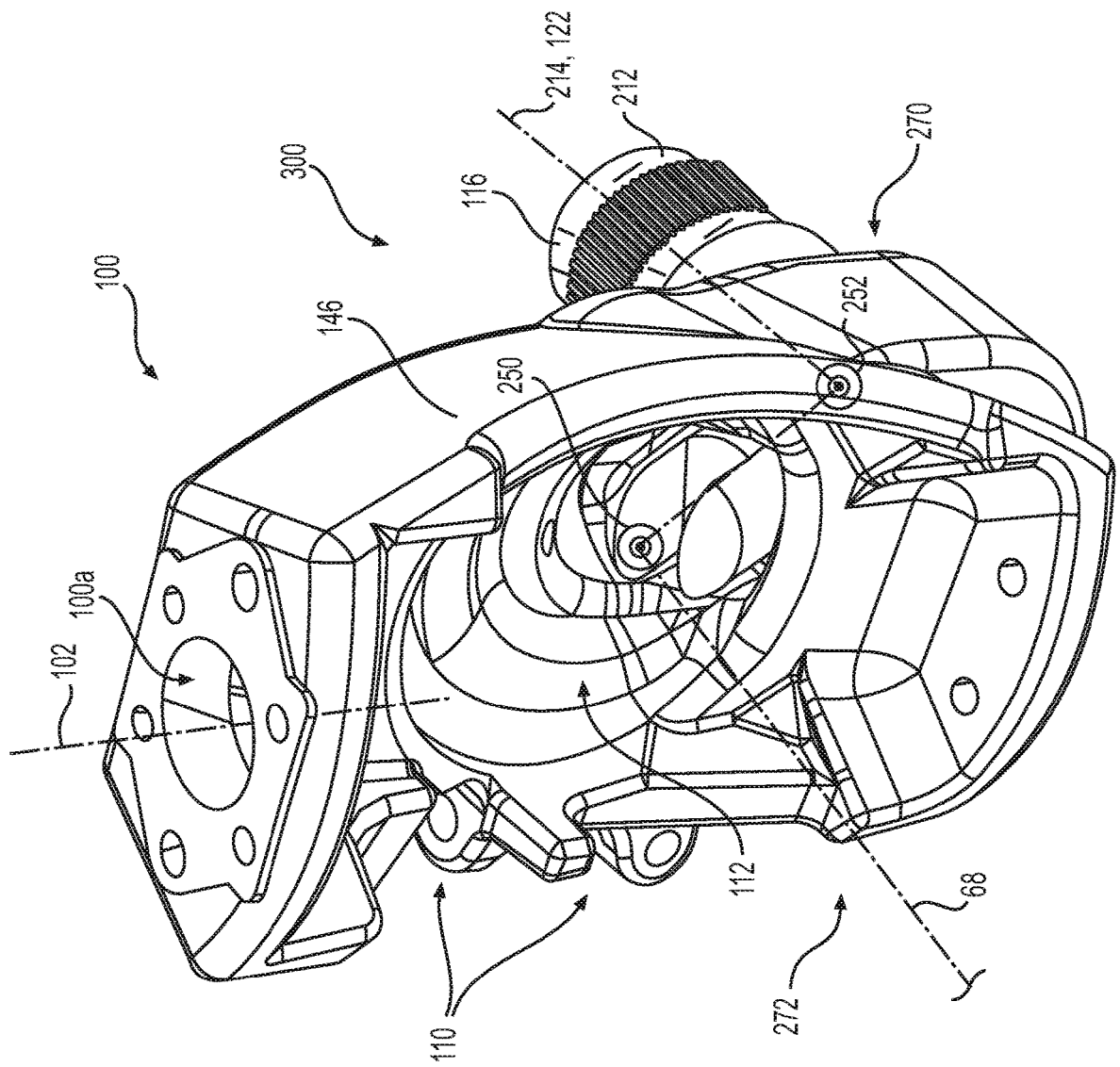
FIG. 9 is a perspective view taken from a top, rear, left side of a steering knuckle of the front right steerable track system of FIG. 7.
Figure 10:
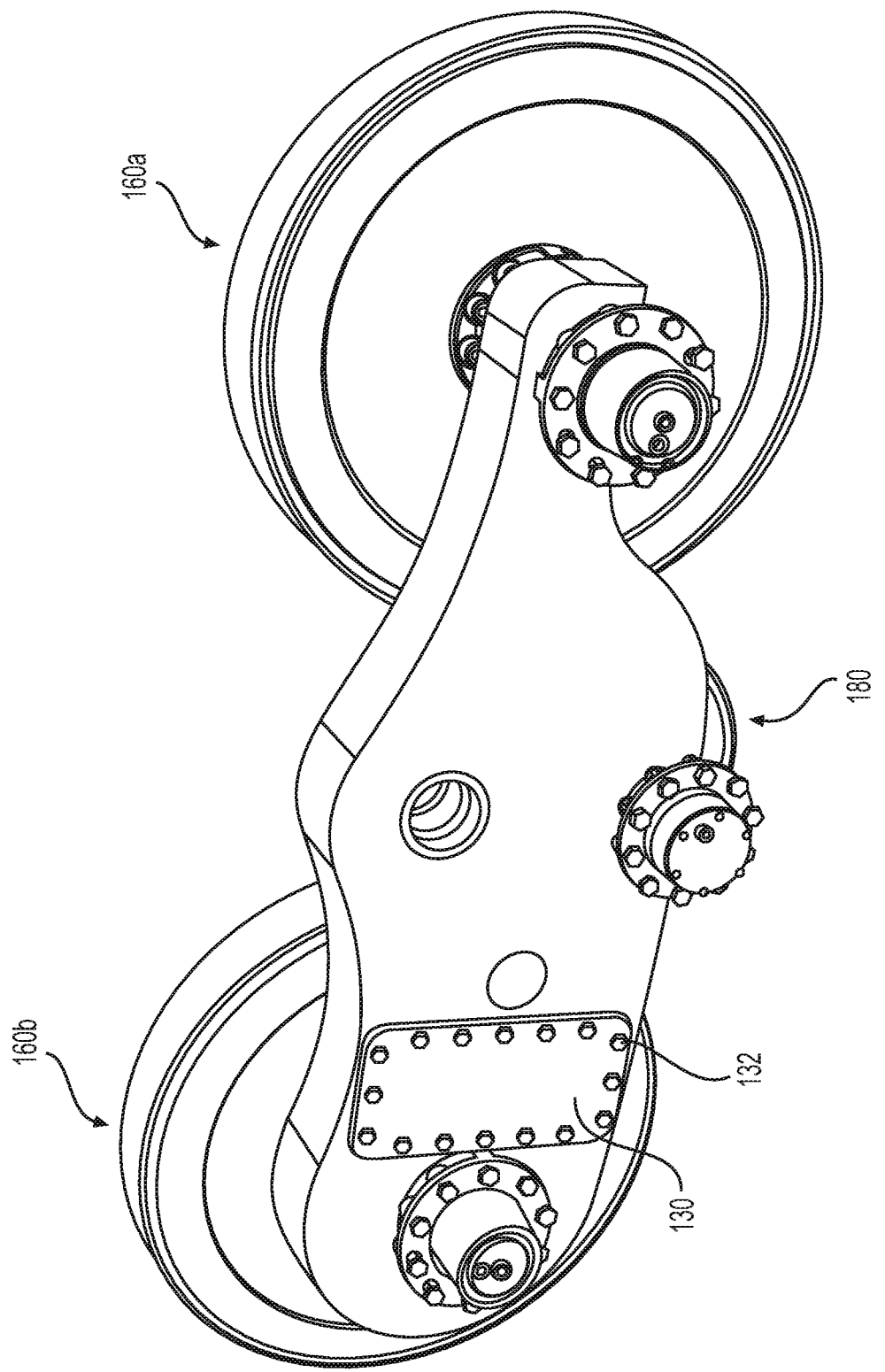
FIG. 10 is a perspective view taken from a top, front, right side of the front right steerable track system of FIG. 4, shown with the right-side wheels removed.
Figure 11:
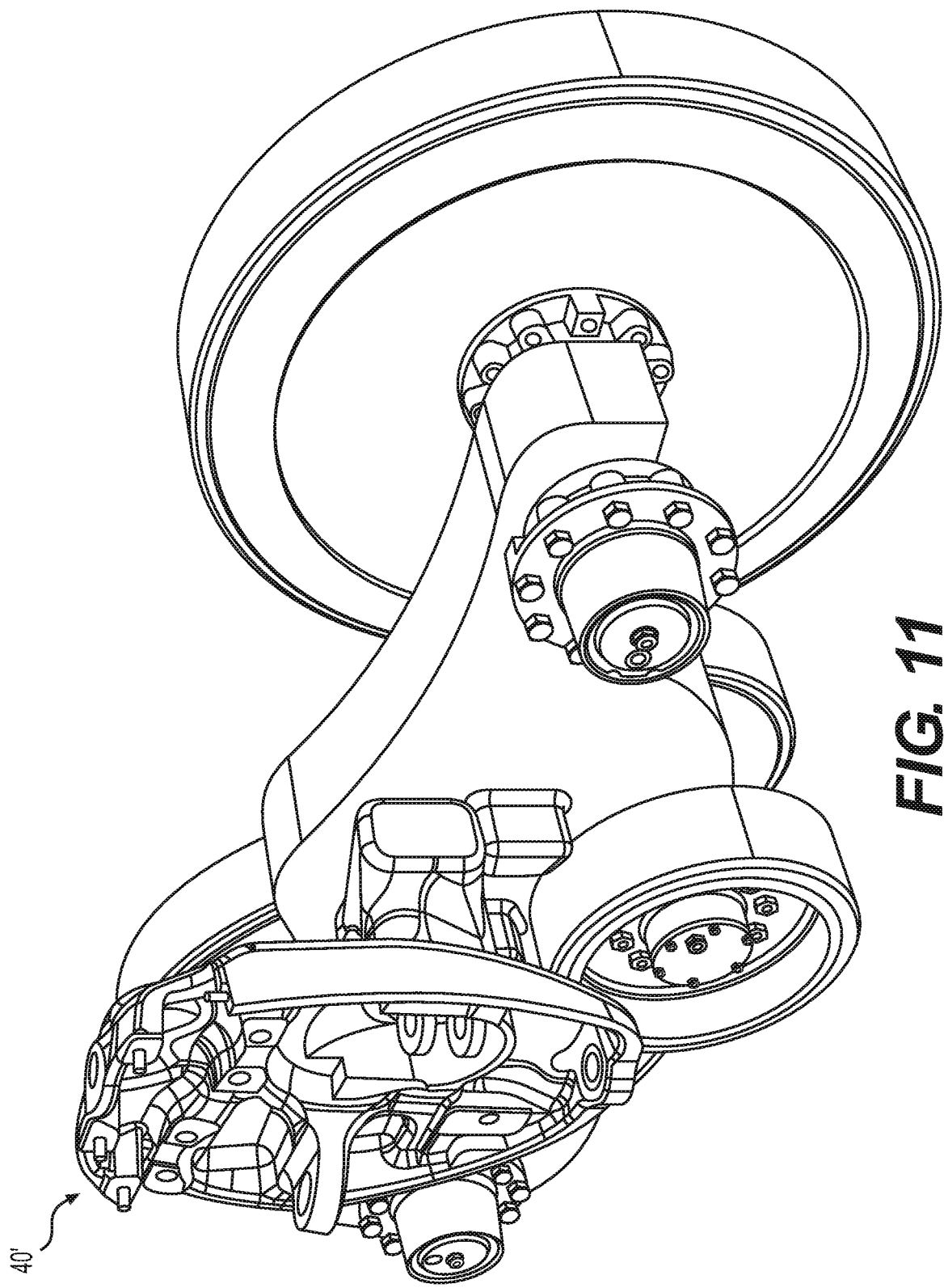
FIG. 11 is a perspective view taken from a top, front, right side of the front left steerable track system of FIGS. 2A to 2E, shown with the inner wheels removed.

Referring now to FIG. 9, the steering knuckle 100 includes tabs 110 for attachment of a tie rod 88, 88' thereto. The tie rod 88' is a mirror image of the tie rod 88. The tie rod 88 extends from the vehicle 60 to the tabs 110. The tie rod 88 is operatively connected to the steering wheel (not shown) of the vehicle 60. When the steering wheel is turned, the tie rods push or pull on the steering knuckle 100, causing the steering knuckle 100 to pivot about the steering axis 102 to steer the track system 40. For example, FIG. 2C shows the track system 40 (as well as 40') being in a rightward steering position.

Still referring to FIG. 9, the steering knuckle 100 has a passageway 112 defined therein. The passageway 112 extends laterally through the body 146 of the steering knuckle 100. In the present embodiment, there is provided a powertrain assembly 300, which includes two constant velocity joints 250, 252, the driven shaft 68, and an input shaft 212 of a gear train 200 (described in more detail below) of the steerable track system 40. In particular, the driven shaft 68 is connected to the input shaft 212 via the two constant velocity joints 250, 252. In other embodiments, different connecting mechanisms connect the driven shaft 68 to the input shaft 212.

In the present embodiment, the driven shaft 68 extends partially into the passageway 112, and the two constant velocity joints 250, 252 are disposed in the passageway 112. The two constant velocity joints 250, 252 are conventionally known constant velocity joints and are therefore not described in more detail herein.

The passageway 112 is shaped and dimensioned so as to allow pivotal motion of the steering knuckle 100 about the steering axis 102. In the present embodiment, the passageway 112 is shaped and dimensioned such that the powertrain assembly 300 does not contact the walls of the steering knuckle 100 that define the passageway 112 when the steering knuckle 100 (and therefore also the frame 120) pivots about the steering axis 102. In the present embodiment, the passageway 112 extends in a vertical direction and has an elbow shape, but the passageway 112 will have other shapes and configurations in different embodiments. For example, in another embodiment, the passageway 112 is straight and coaxial to the frame pivot axis 122.

In a further aspect, the steering knuckle 100 has a pivot supporting portion 116 (FIG. 9) to which the frame 120 is pivotably connected. Bushings and bearings (not shown) are disposed between the pivot supporting portion 116 and the frame 120 to allow for the pivoting of the frame 120 about the frame pivot axis 122. In other embodiments, bushings and/or bearings (not shown) are disposed between the pivot supporting portion 116 and the frame 120 to allow for the pivoting of the frame 120 about the frame pivot axis 122.

Figure 2D:
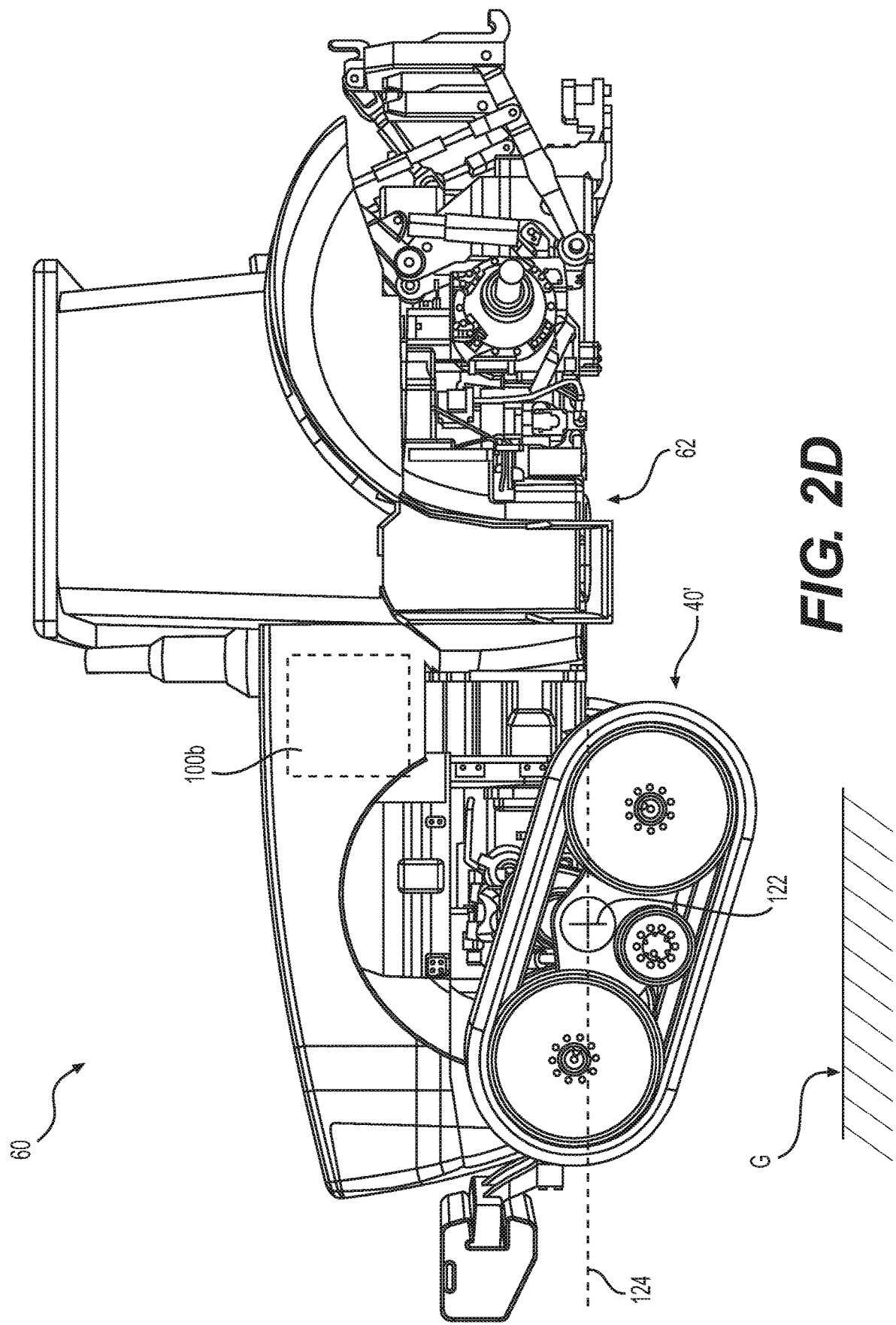
FIG. 2D is a left side elevation view of the vehicle of FIG. 2A, with the front left steerable track system being in a positive pitch position.
Figure 6:
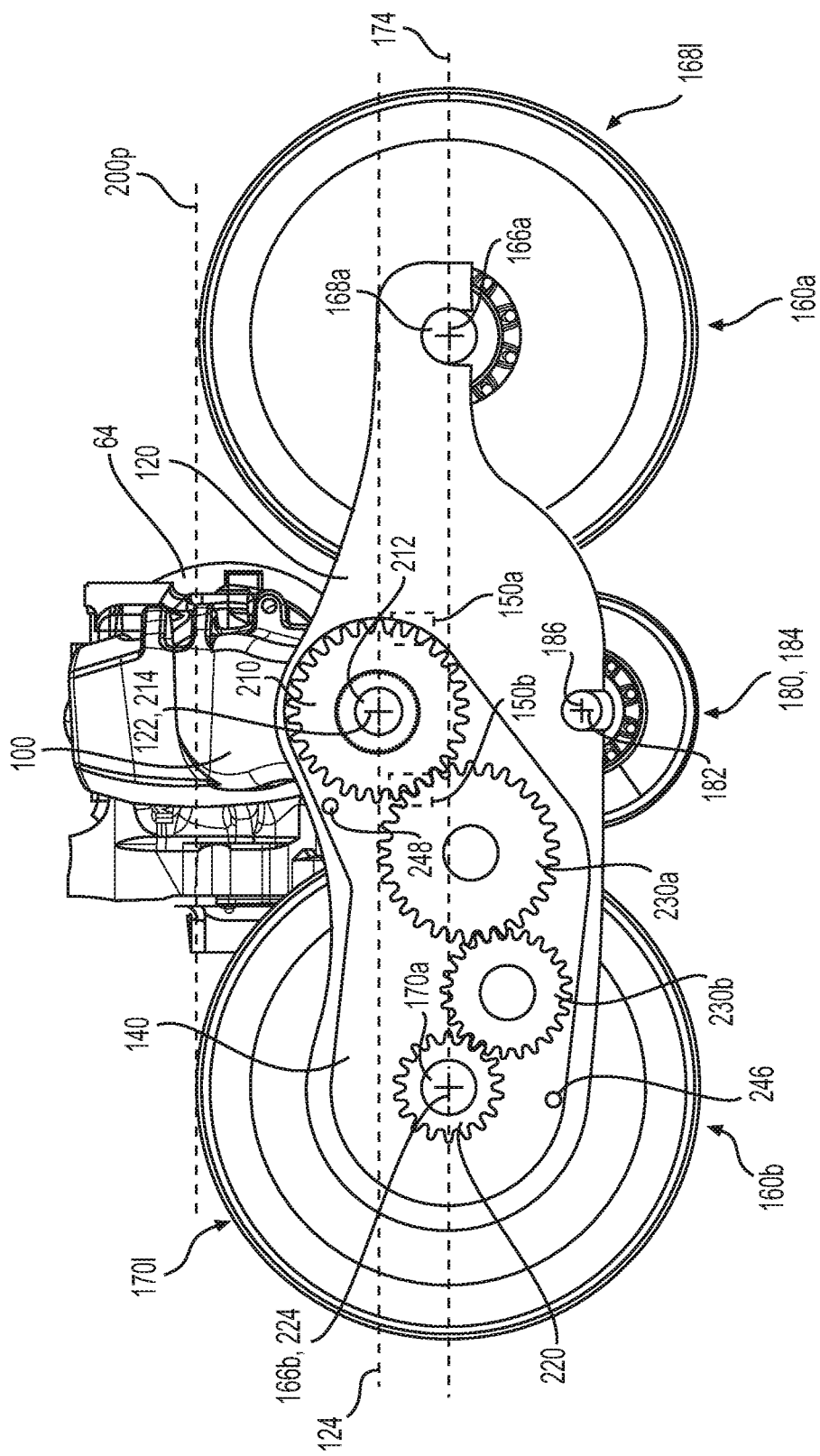
FIG. 6 is a cross-sectional view of the front right steerable track system of FIG. 5 taken along cross-section line 6-6 of FIG. 5.

In the present embodiment, the frame pivot axis 122 is transverse and horizontal. In other embodiments, the frame pivot axis 122 is not horizontal. As a non-limiting example, in other embodiments the frame pivot axis is angled relative to a horizontal reference plane and/or a vertical reference plane. The frame pivot axis 122 lies in a horizontal plane 124 that is parallel to a flat level ground surface G (FIG. 2D). As best shown in FIG. 6, the plane 124 extends below the axle frame 64. In other embodiments, the frame pivot axis 122 (and therefore the plane 124) are positioned differently.

Figure 2E:
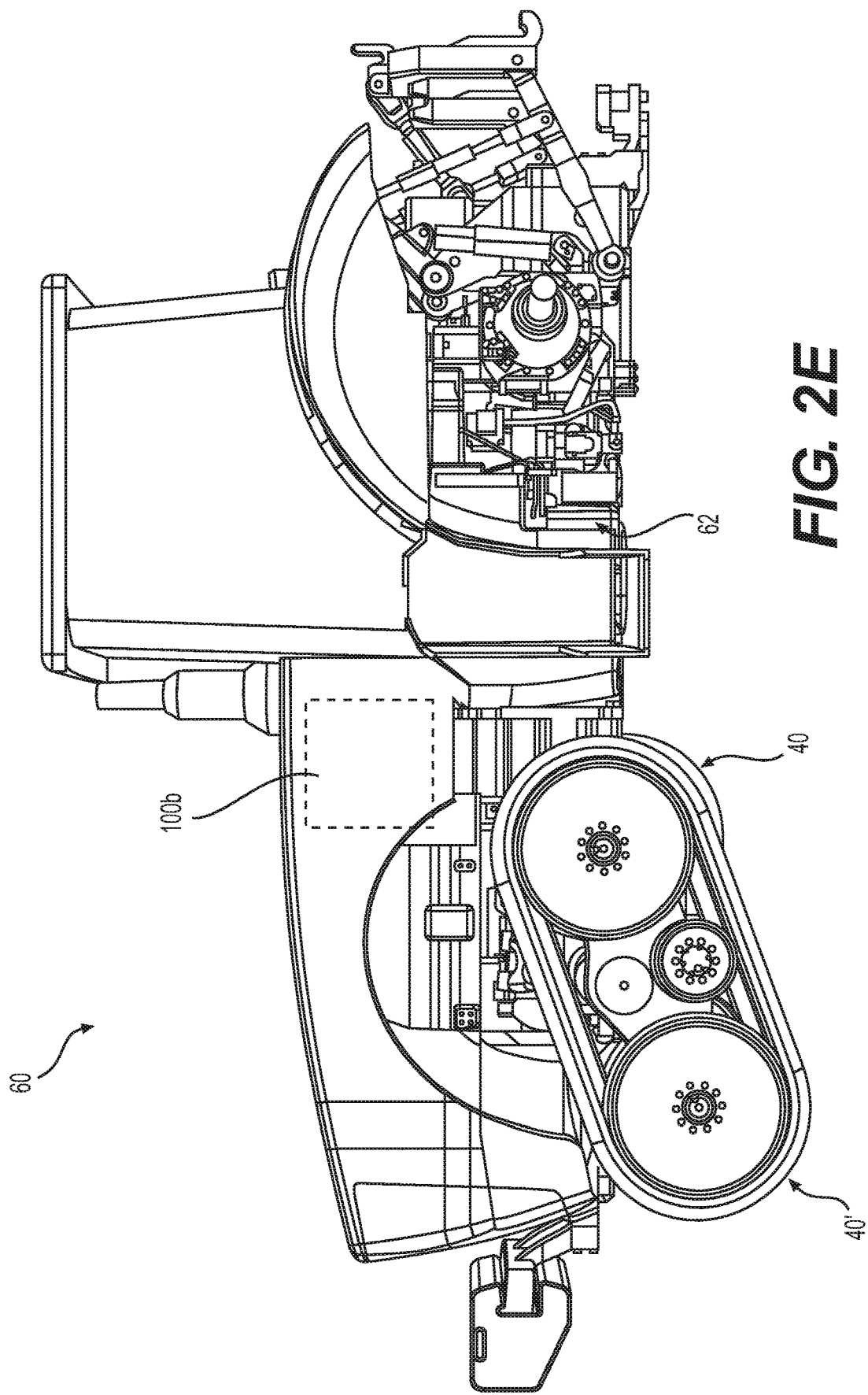
FIG. 2E is a left side elevation view of the vehicle of FIG. 2A, with the front left steerable track system being in a negative pitch position.

As shown in FIGS. 2D and 2E, when the frame 120 pivots about the frame pivot axis 122, the steerable track system 40' pitches accordingly. In FIG. 2D, the steerable track system 40' is shown having a positive pitch. In FIG. 2E, the steerable track system 40' is shown having a negative pitch. In one aspect, the pitching helps the steerable track system 40' in conforming irregularities in the ground surface on which the vehicle 60 travels. In another aspect, the pitching reduces mechanical stress on vehicle components and steerable track system 40 components by converting torque applied to the steerable track system 40 by the ground G into pitching motion of the steerable track system 40.

As best schematically shown in FIG. 6, integrally formed stops 150a, 150b are provided on the frame 120 to limit the pivoting of the frame 120 about the frame pivot axis 122. The stop The stops 150a, 150b extend laterally inwardly from an inward face of the frame 120. The stop 150a is located in front of the frame pivot axis 122 and the stop 150b is located behind the frame pivot axis 122. In the present embodiment, the stop 150a is a mirror image of the stop 150b. It is contemplated that the stops 150a, 150b could be different from each other.

The stops 150a, 150b are positioned on the frame 120 to contact corresponding parts 270, 272 (FIG. 9) of the steering knuckle 100 to limit the pivoting of the frame 120 about the frame pivot axis 122. It is contemplated that portions of the steering knuckle 100 could be sized and dimensioned (for example, to define protrusions extending from the body of the steering knuckle 100) to selectively contact the stops 150a, 150b (for example, by abutting against corresponding ones of the stops 150a, 150b) during pivoting of the frame 120 about the frame pivot axis 122 to limit the pivoting of the frame 120 about the frame pivot axis 122.

It is contemplated that a different mechanism could be used to limit the pivoting of the frame 120 about the frame pivot axis 122. It is contemplated that, in some embodiments, the stops 150a, 150b could be omitted. In a further aspect, it is contemplated that the frame 120 need not be pivotably connected to the steering knuckle 100, and could be, for example, fixed to the steering knuckle 100. It is contemplated that in embodiments in which the frame 120 is fixed to the steering knuckle 100 (and is therefore non-pivotal relative to the steering knuckle 100), the bushings and/or bearings disposed between the pivot supporting portion 116 and the frame 120 could be omitted.

Figure 4:
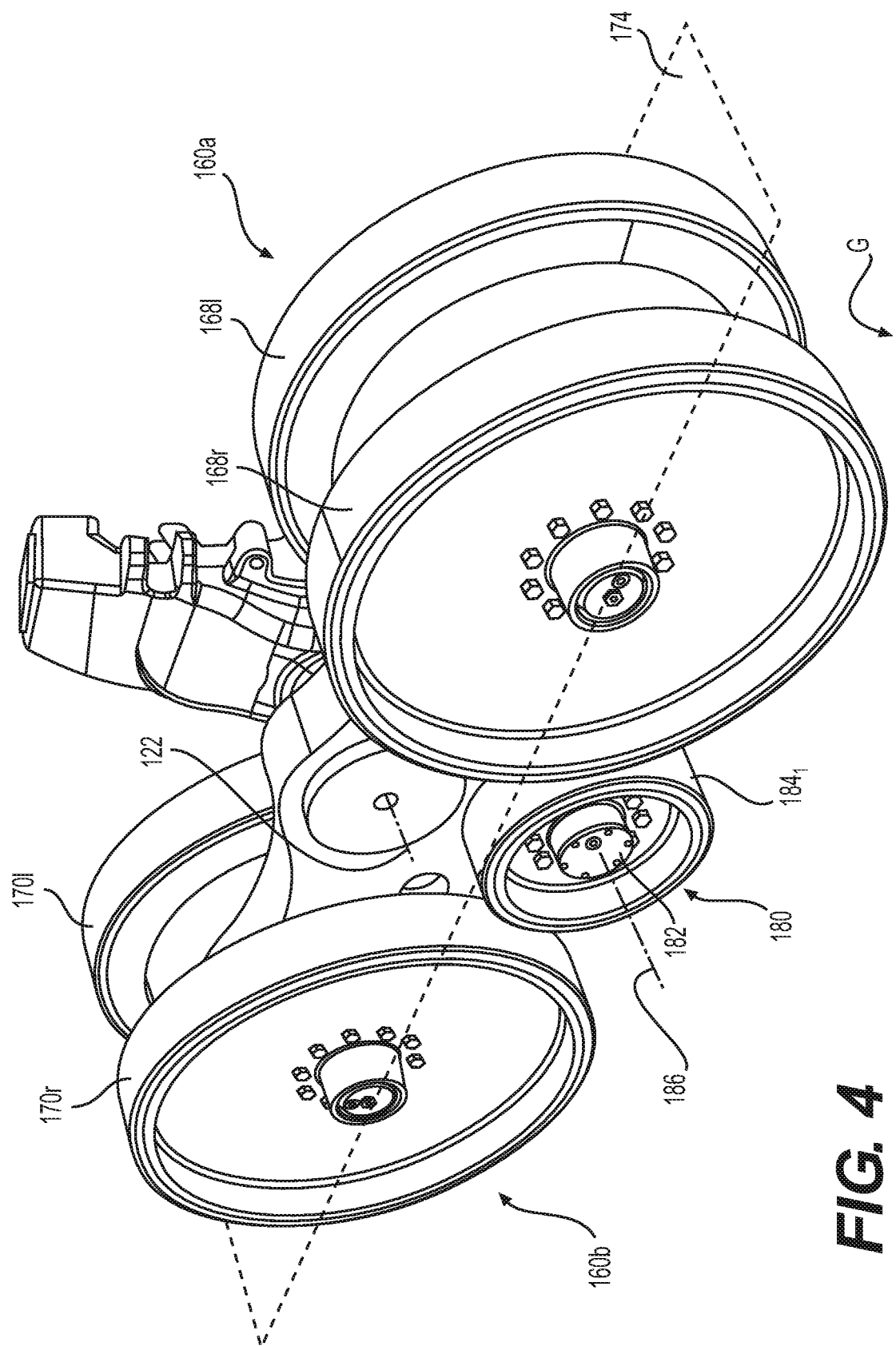
FIG. 4 is perspective view taken from a top, front, right side of the front right steerable track system of FIG. 1, shown with the endless track removed.
Figure 5:
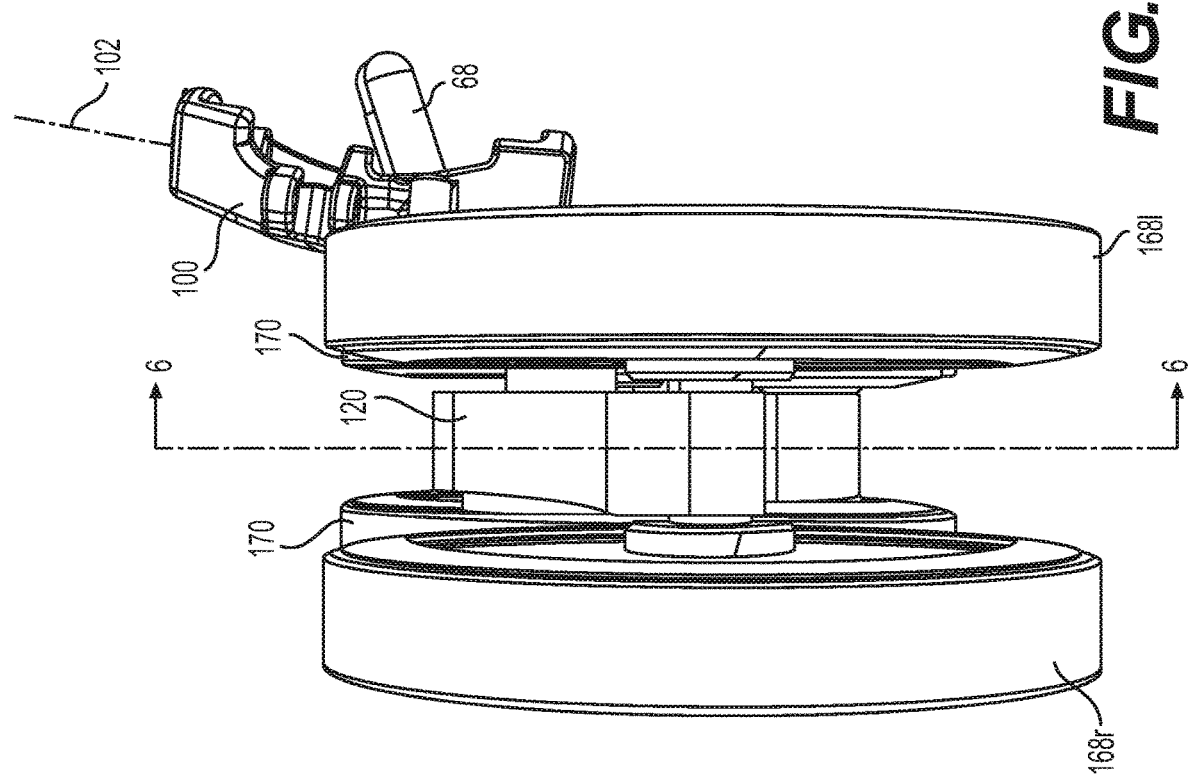
FIG. 5 is a front elevation view of the front right steerable track system of FIG. 1.

Now referring to FIG. 6, the frame 120 is disposed laterally outwardly from the steering knuckle 100. A leading track-supporting wheel assembly 160a is rotatably supported by the frame 120 forwardly of the frame pivot axis 122. As best shown in FIGS. 4 and 5, the leading track-supporting wheel assembly 160a includes two coaxial leading track-supporting wheels 168l, 168r. A trailing track-supporting wheel assembly 160b is rotatably supported by the frame 120 rearward from the frame pivot axis 122. As best shown in FIG. 4, the trailing track-supporting wheel assembly 160b includes two coaxial trailing track-supporting wheels 170l, 170r. All of the track-supporting wheels 168l, 168r, 170l, 170r are shown in FIG. 4.

Still referring to FIG. 6, the wheels 168l, 168r, 170l, 170r are rotatably connected to the frame 120 via axles 168a, 170a, respectively. However, any other suitable conventional mechanism could be used.

In the present embodiment, wheels 168l, 168r, 170l, 170r of the leading track-supporting wheel assembly 160a and the trailing track-supporting wheel assembly 160b have one and the same wheel diameter (in other embodiments, the leading track-supporting wheel assembly 160a and the trailing track-supporting wheel assembly 160b have different wheel diameters). The wheels 168l, 168r are rotatable about an axis of rotation 166a. The wheels 170l, 170r are rotatable about an axis of rotation 166b.

In the present embodiment, the axes 166a, 166b lie on a horizontal plane 174 that is parallel to the flat level ground surface G. The plane 174 extends below the frame pivot axis 122. In some embodiments, the plane 174 extends above the frame pivot axis 122. In some embodiments, the plane 174 is not horizontal and not parallel to the flat level ground surface G. In some embodiments, the steerable track assembly 40 has a different number of wheels.

Still referring to FIG. 6, a roller wheel assembly 180 is rotatably supported by the frame 120 and disposed intermediate the leading track-supporting wheel assembly 160a and the trailing track-supporting wheel assembly 160b. The roller wheel assembly 180 has two coaxial roller wheels 184 mounted onto a roller wheel axle 182 to rotate about a roller wheel axis 186. However, any other suitable conventional mechanism could be used. In some embodiments, the roller wheel assembly 180 is omitted. In some embodiments, multiple roller wheel assemblies 180 are present.

As shown in FIGS. 1 to 3, an endless track 280 extends around the leading track-supporting wheel assembly 160a, the trailing track-supporting wheel assembly 160b and the roller wheel assembly 180. In the present embodiment, the endless track 280 has an obround travel path (best shown in FIG. 3) around the track-supporting wheel assemblies 160a, 160b. It is contemplated that the endless track 280 could have a different travel path, such as a triangular travel path.

In the present embodiment, the endless track 280 is driven by the trailing track-supporting wheel assembly 160b via friction between an inner surface 282 of the endless track 280 and an outer surface of the wheels 170l, 170r of the trailing track-supporting wheel assembly 160b. In the art of track systems, this system is known as a "friction drive". Friction drives are conventionally known.

It is contemplated that a different driving mechanism could be used. For example, it is contemplated that the endless track 280 could have lugs on the inner surface 282, and the trailing track-supporting wheel assembly 160b could have a single drive wheel with apertures for receiving and engaging the lugs to transfer driving forces to the endless track 280. In the art of track systems, this system is known as a "positive drive". Positive drives are conventionally known.

The endless track 280 also has an outer surface 286 with a tread 280c for ground engagement. It is contemplated that the tread 280c can be varied according to the type of vehicle on which the steerable track system 40 is to be used with and/or the type of ground surface on which the vehicle 60 will be driven. In the present embodiment, the track is polymeric. It is contemplated that the endless track 280 may be constructed of any suitable materials and may include reinforcement structures therein, including metallic reinforcing rods known in the art of track systems. The properties and materials of the endless track 280 will not be described in detail given that they are conventional.

The frame 120 will now be described in more detail. The frame 120 has a cavity 140 defined therein. In the present embodiment, the cavity 140 extends longitudinally from a region in front of the frame pivot axis 122 to a region rearward of the trailing track-supporting wheel axle 162b. In this embodiment, the longitudinal orientation of the cavity 140 allows to maintain a relatively low overall height profile of the steerable track system 40.

In this embodiment, the longitudinal orientation of the cavity 140 allows the steerable track system 40 to be used with relatively small vehicles, such as tractors used on vineyards, while requiring relatively few modifications to such vehicles. In other embodiments, this is not the case. In this application, for a given size of the steerable track system 40, the cavity 140 in combination with the gear train 200 reduces the overall weight of the given embodiment of the steerable track system 40 while maintaining a similar level of structural strength of the steerable track system 40. In other embodiments, this is not the case.

The frame 120 further has a panel 130 (FIG. 10) removably connected to an outward face of the frame 120 via fasteners 132 (only one of which is labeled, to maintain clarity) to selectively provide access to the cavity 140, for example, for servicing components housed in the cavity 140.

The gear train 200 (referred to above) of the steerable track system 40 is supported by the frame 120. In the present embodiment, the gear train 200 includes an input gear 210 mounted on the input shaft 212 that rotates about an input gear axis 214, and an output gear 220 mounted on an output shaft 222 that rotates about an output gear axis 224. Intermediate gears 230a, 230b operatively connect the input gear 210 to the output gear 220 to drive the output gear 220. In other words, in the present embodiment, the gear train 200 consists of the gears 210, 220, 230a, 230b, the input shaft 212 and the output shaft 222. In other embodiments, the gear train 200 includes a different number of gears.

In other embodiments, the gear train 200 could have additional and/or other components. It is contemplated the gear train 200 could have a single intermediate gear, no intermediate gears, or more than two intermediate gears.

In the present embodiment, the input gear 210 drives the output gear 220 in a direction opposite to the direction of rotation of the input gear 210. In other embodiments, the gear train 200 has a combination of gears via which the input gear 210 drives the output gear 220 in a same direction of rotation as the input gear 210. In the present embodiment, the direction of rotation of the input gear 210 relative to the direction of rotation of the output gear 220 is selected to match the direction of rotation of the tire 60c replaced by the steerable track system 40. The entirety of the gear train 200 is below a plane tangential 200p (FIG. 6) (further referred to as "tangential plane") to an uppermost point of each surface of the track-supporting wheel assemblies 160a, 160b. Also, the entirety of the frame 120 is below the tangential plane 200p.

Figure 7:
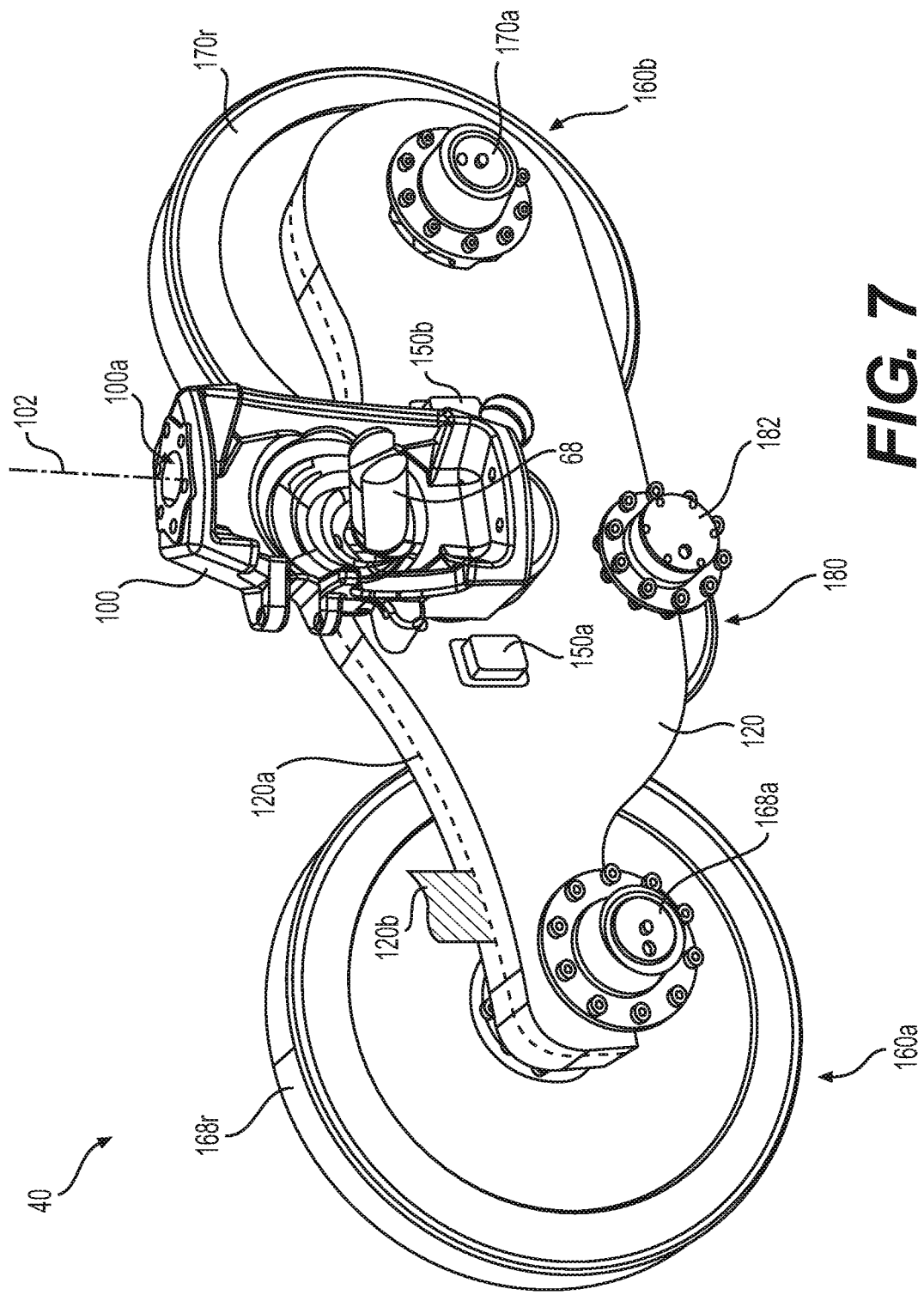
FIG. 7 is a perspective view taken from a top, front, left side of the front right steerable track system of FIG. 1, shown with the left-side wheels removed.
Figure 13:
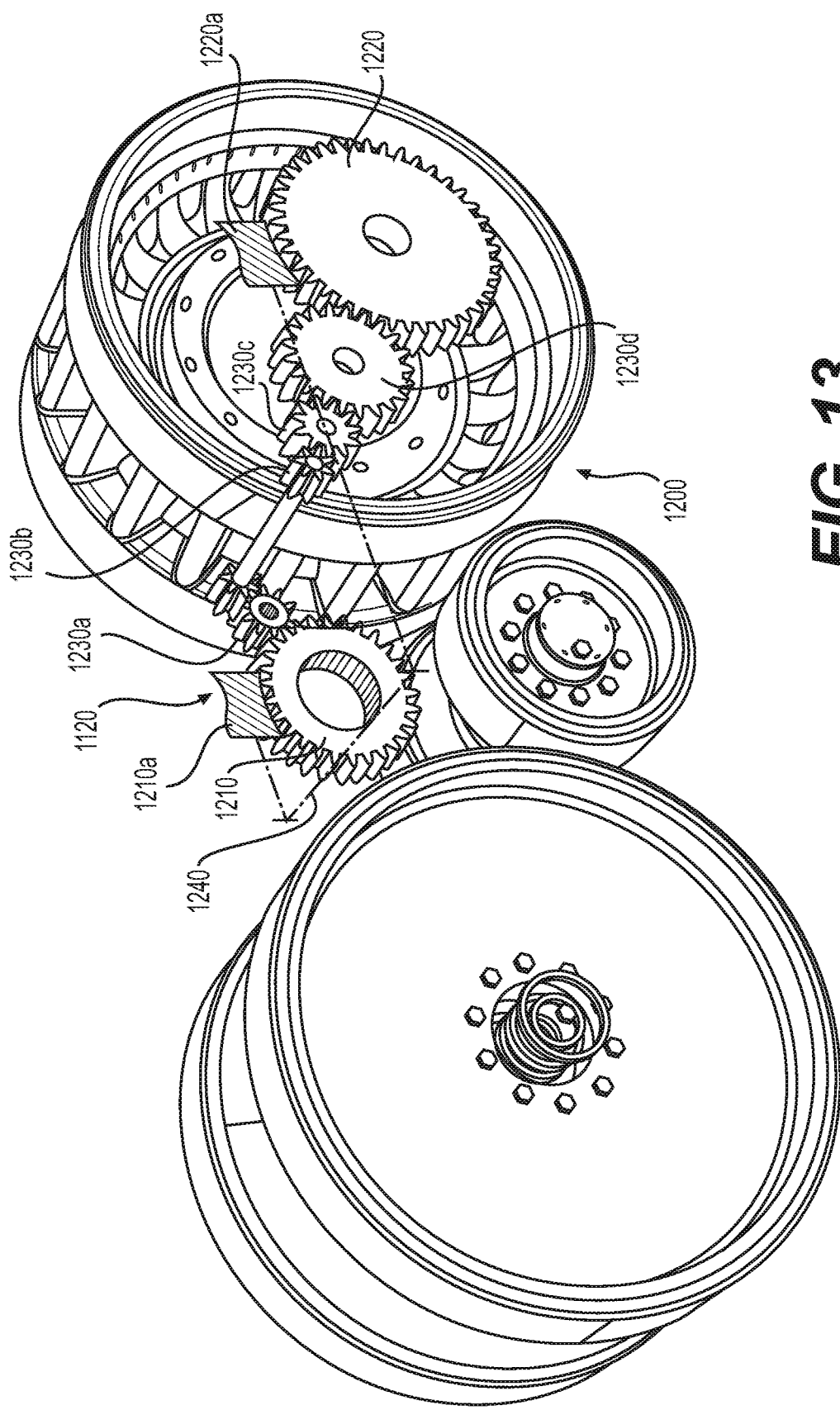
FIG. 13 is a perspective view taken from a top, front, left side of the front right steerable track system of FIG. 12, shown with the frame removed.

As best shown by FIGS. 6 and 7, the gears 210, 220 (FIG. 6) are coplanar in a vertical plane 120b (FIG. 7) parallel to a longitudinal centerline 120a (FIG. 7) of the frame 120. In the present embodiment, the vertical plane 120b includes the longitudinal centerline 120a of the frame 120. It is contemplated that the gears 210, 220 could lie in different planes (in which case the gears 210, 220 would be non-coplanar). For example, as shown in the alternative embodiment of the steerable track system 40 shown in FIG. 13 (which embodiment will be described in more detail below), the input gear 1210 lies in a first plane 1210a, the output gear 1220 lies in a second plane 1220a, and the first plane 1210a is offset laterally outwardly from the second plane 1220a. The outwardly lateral offset is shown by reference lines 1240 (FIG. 13).

Referring now to FIG. 6, in the present embodiment, the input gear axis 214 is coaxial with the frame pivot axis 122 and the output gear axis 224 is coaxial with axis 166b (described below).

In the present embodiment, the gears 210, 220, 230a, and 230b are disposed inside the cavity 140. The cavity 140 is shaped and dimensioned relative to the frame 120 to provide an overall structural strength of the frame 120 sufficient to support the part of the vehicle 60 supported by the track 280 of the steerable track assembly 40. In one example, the structural strength of the frame 120 could be determined, and modeled, using conventionally known finite element analysis.

It is contemplated that any other suitable modeling method could be used. It is contemplated that the particular shape of the cavity 140 would be selected based on each particular embodiment of the gear train 200 and the frame 120, using conventionally known engineering principles, in order to provide a relatively lighter construction of the frame 120 while maintaining a sufficient structural strength of the frame 120.

The cavity 140 contains lubricant for lubricating the gears 210, 220, 230a, 230b. The cavity 140 is fluidly sealed using conventionally known seals (not shown) to prevent leakage of lubricant out of the cavity 140. It is contemplated that the lubricant could be a transmission fluid selected using conventionally lubricant selection methods for each particular use of the vehicle 60 and for each particular environment in which the vehicle 60 is used.

As best shown in FIG. 6, in the present embodiment, a lubricant injection port 246 and a vent port 248 are defined in the frame 120 and are in fluid communication with the cavity 140 for adding lubricant to the cavity 140 and periodically replacing lubricant in the cavity 140. The lubricant injection port 246 is threaded and sized to removably receive a bolt (not shown) for fluidly sealing the lubricant injection port 246. Similarly, the vent port 248 is threaded and sized to removably receive a bolt (not shown) for fluidly sealing the vent port 248. It is contemplated that a different type of plug could be used for one or both of the lubricant injection port 246 and the vent port 248. In other embodiments, the injection port 246 is positioned in a lowest point in the cavity 140.

It is contemplated that a different lubrication system could be used to lubricate the gear train 200, depending on each particular embodiment of the steerable track system 40. For example, it is contemplated that, depending on the particular gear train 200, the gear train 200 may not need to be bathed in lubricant during use, in which case the cavity 140 could contain no lubricant bath and could have no fluid seals.

As described herein above, the input shaft 212 of the gear train 200 is operatively connected to the driven shaft 68 via the two constant velocity joints 250, 252. More particularly, at its one end, the input shaft 212 is received in the input gear 210. The input shaft 212 extends from the input gear 210 toward the vehicle 60, and out of the cavity 140 through a side of the frame 120 facing toward the vehicle 60. The input shaft 212 is rotatably received through the side of the frame 120 facing toward the vehicle 60 via a conventionally known fluidly sealed bearing assembly (not shown).

The output shaft in this embodiment is the axle 170a. The output shaft 170a is operatively connected to the trailing track-supporting wheel assembly 160b to drive the trailing track-supporting wheel assembly 160b by being received through (going in order laterally outwardly from the vehicle 60) the wheel 170l, the side of the frame 120 facing toward the vehicle 60, the output gear 220, a side of the frame 120 facing away the vehicle 60, and through the wheel 170r. The output shaft 170a is fixedly coupled to each of the wheels 170l, 170r, and the output gear 220, and is rotatably received through the two sides of the frame 120 via a conventionally known fluidly sealed bearing assembly (not shown).

In other words, the gear train 200 operatively connects the driven shaft 68 to the trailing track-supporting wheel assembly 160b to drive the trailing track-supporting wheel assembly 160b. It is contemplated that the gear train 200 could instead operatively connect the driven shaft 68 to the leading track-supporting wheel assembly 160a, in addition to or instead of operatively connecting to the driven shaft 68 to the trailing track-supporting wheel assembly 160b.

In some such embodiments, the frame 120 and the gear train 200 are mirrored relative to a vertical plane passing through the frame pivot axis 122 such that the frame pivot axis 122 lies in the vertical plane, and such that the gear train 200 extends from the frame pivot axis 122 to the front wheels 168*l*, 168*r* and operatively connects to the front wheels 168*l*, 168*r*, instead of the rear wheels 170*l*, 170*r*.

In other such embodiments, the part of the frame 120 disposed in front of the frame pivot axis 122 is dimensioned to accommodate a part of the cavity 140 and additional gears therein. In such cases, the cavity 140 extends from the output gear 220 to the axle 166*a* of the front wheels 168*l*, 168*r*, and the gear train 200 includes additional gears (not shown) disposed inside the cavity that operatively connect the input gear 210 to the axle 166*a* of the front wheels 168*l*, 168*r*. In such embodiments, the axle 166*a* extends through the frame 120 and the cavity 140 and is fixedly coupled to the front wheels 168*l*, 168*r* to drive the front wheels 168*l*, 168*r*. The axle 166*a* is rotatably received through the two sides of the frame 120 via a conventionally known fluidly sealed bearing assembly (not shown).

The additional gears are analogous to the gears 220, 230*a*, 230*b*. For example, the additional gears include a second output gear (not shown) mounted onto the axle 166*a* inside the cavity 140 in an analogous way to the way (described herein above) that the output gear 220 is mounted onto the axle 170*a*, to drive the axle 166*a*. The additional gears also include additional intermediate gears (not shown) that operatively connect the input gear 210 to the second output gear at a gear ratio that is equal to the gear ratio between the input gear 210 and the output gear 220, such that the front wheels 168*l*, 168*r* are driven at the same rotational speed as the rear wheels 170*l*, 170*r*. In embodiments where the radius of the front wheels 168*l*, 168*r* is different from the radius of the rear wheels 170*l*, 170*r*, the gear ratio between the input gear 210 and the second output gear is selected using a suitable conventional gear ratio selection method such that the front wheels 168*l*, 168*r* are driven at the same ground speed as the rear wheels 170*l*, 170*r*.

Yet further aspects of the gear train 200 of the steerable track system 40 are described next.

In the present embodiment, and as best shown in FIG. 6, the input gear 210, the output gear 220, and the driven wheel assembly 60*b* are dimensioned such that, for a given driven shaft 68 rotational speed, a ground speed of the endless track 280 is within a predetermined percentage of the ground speed of the tire 60*c*. In the present embodiment, the predetermined percentage is zero percent. That is, in the present embodiment, for a given driven shaft 68 rotational speed, the ground speed of the endless track 280 is equal to the ground speed of the tire 60*c*.

In this description, ground speed (in this case, measured in meters per minute) is the speed traveled along a flat level ground surface G, measured in meters per minute (or any other suitable units). Ground speed of the endless track 280 of the vehicle 60 is calculated as the effective radius 170*r* r (FIG. 3) of the driven wheels 170 (in this case, measured in meters), multiplied by 2π (to obtain meters travelled by the wheels 170 along the flat level ground surface G per each 360-degree rotation of the wheels 170 about the axis 166*b*), and multiplied by the rotational speed (in this case, measured in rotations per minute) of the driven wheels 170.

In the present embodiment, and as shown in FIG. 3, the effective radius 170*r* r of the driven wheels 170 is the sum of the radius 170*d* of the driven wheels 170 and the thickness 280*t* of the endless track 280 (inclusive of the thickness 280*b* of the tread 280*c* of the endless track 280). The ground speed (in this case, measured in meters per minute) of the tire 60*c* (which was replaced by the steerable track assembly 40) is calculated by multiplying the radius 60*r* (FIG. 3) (in this case, measured in meters) of the tire 60*c* by 2π (to obtain meters travelled by the tire 60*c* along the flat level ground surface G per each 360-degree rotation of the tire 60*c*) and by the rotational speed of the tire 60*c* (in this case, measured in rotations per minute).

In the present embodiment, the steerable track system 40 is designed to replace a tire 60*c* that has a radius 60*r* larger than the effective radius 170*rr* of the driven wheels 170*l*, 170*r* of the steerable track system 40. Therefore, when the tire 60*c* and the driven wheels 170*l*, 170*r* rotate at the same rotational speed, the tire 60*c* has a higher ground speed than the driven wheels 170*l*, 170*r*. Since, in at least some applications, it is desirable to operate the steerable track system 40 at the same ground speed as the tire 60*c* that the steerable track system 40 replaced, the gear train 200 is selected to rotate the rear wheels 170*l*, 170*r* at a higher rotational speed than the tire 60*c*, relative to the rotational speed of the driven shaft 68.

More particularly, the input gear 210 and the output gear 220 are selected such that the input gear 210 has a number of teeth 210*a* that is greater than the number of teeth 220*a* of the output gear 220. In one aspect, this results in the input gear 210 driving the output gear 220 at a rotational speed that is faster than the rotational speed of the input gear 210 for a given driven shaft 68 rotational speed.

In the present embodiment, the ratio between the number of teeth 210*a* and the number of teeth 220*a* is selected by first dividing the radius 60*r* of the tire 60*c* (which includes the thickness of tread of the tire 60*c*) by the effective radius 170*r* r of the driven wheels 170, to determine a factor by which the driven wheels 170 would need to rotate faster than the tire 60*c* in order to provide approximately a same ground speed as the ground speed of the tire 60*c* for a given driven shaft 68 rotational speed.

The desired rotational speed of the driven wheels 170 is then determined by multiplying the rotational speed of the tire 60*c*, at the given driven shaft 68 rotational speed, by the factor determined in the preceding step. The ratio between the number of teeth 210*a* and the number of teeth 220*a* is then selected to provide the desired rotational speed of the driven wheels 170. It is contemplated that the ratio between the number of teeth 210*a* and the number of teeth 220*a*, and each particular combination of gears in the gear train 200, could be selected using any suitable conventionally known engineering principles.

In a further aspect, it is contemplated that the input gear 210, the output gear 220, and the driven wheel assembly 60*b* could be dimensioned such that, for a given driven shaft 68 rotational speed, a ground speed of the endless track 280 is within a predetermined percentage of between 0% and 30% (inclusive) of the ground speed of the tire 60*c*.

It is also contemplated that, for a given set of dimensions of the driven wheels 170, the endless track 280, and the tire 60*c* replaced by the steerable track system 40, the gear train 200 of the steerable track system 40 and the ratio between the number of teeth 210*a* and the number of teeth 220*a* could be selected such that, for a given driven shaft 68 rotational speed, a ground speed of the endless track 280 is within a predetermined percentage of between 0% and 30% (inclusive) of the ground speed of the tire 60*c*.

First Alternative Embodiment

Figure 8:
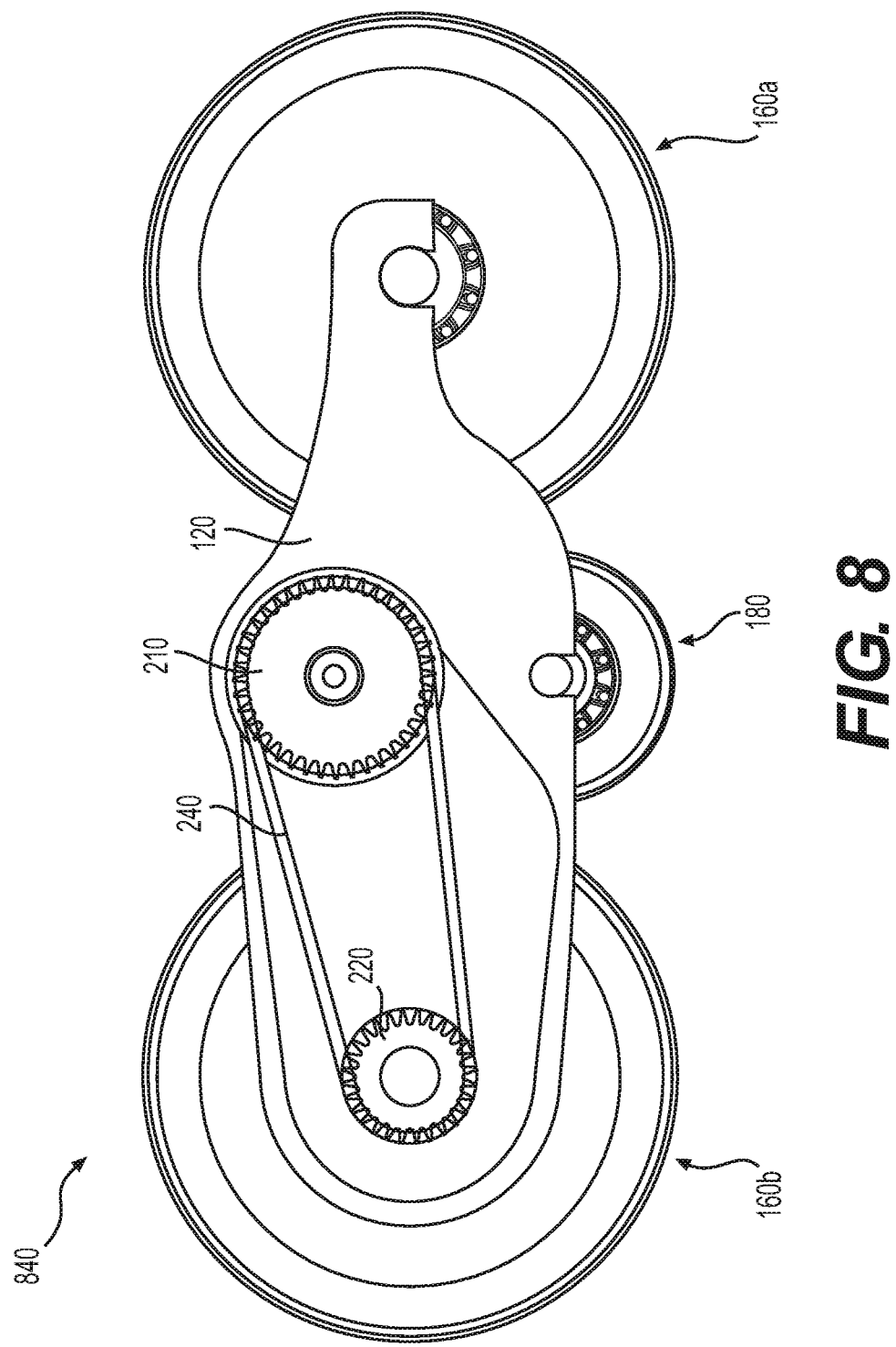
FIG. 8 is a cross-sectional view of the front right steerable track system of FIG. 1 taken along cross-section line 6-6 of FIG. 5, shown as having an alternative embodiment of the gearbox shown in FIG. 6.

Referring to FIG. 8, an alternative embodiment of the gear train 200 is provided. The steerable track system 840 is the same as the steerable track system 40, except insofar as it is described next. In this alternative embodiment, the input gear 210 and the output gear 220 are operatively interconnected by a chain 240. The gear ratio between the input gear 210 and the output gear 220 is selected using a method analogous to the gear ratio selection method described above.

Second Alternative Embodiment

Figure 12:
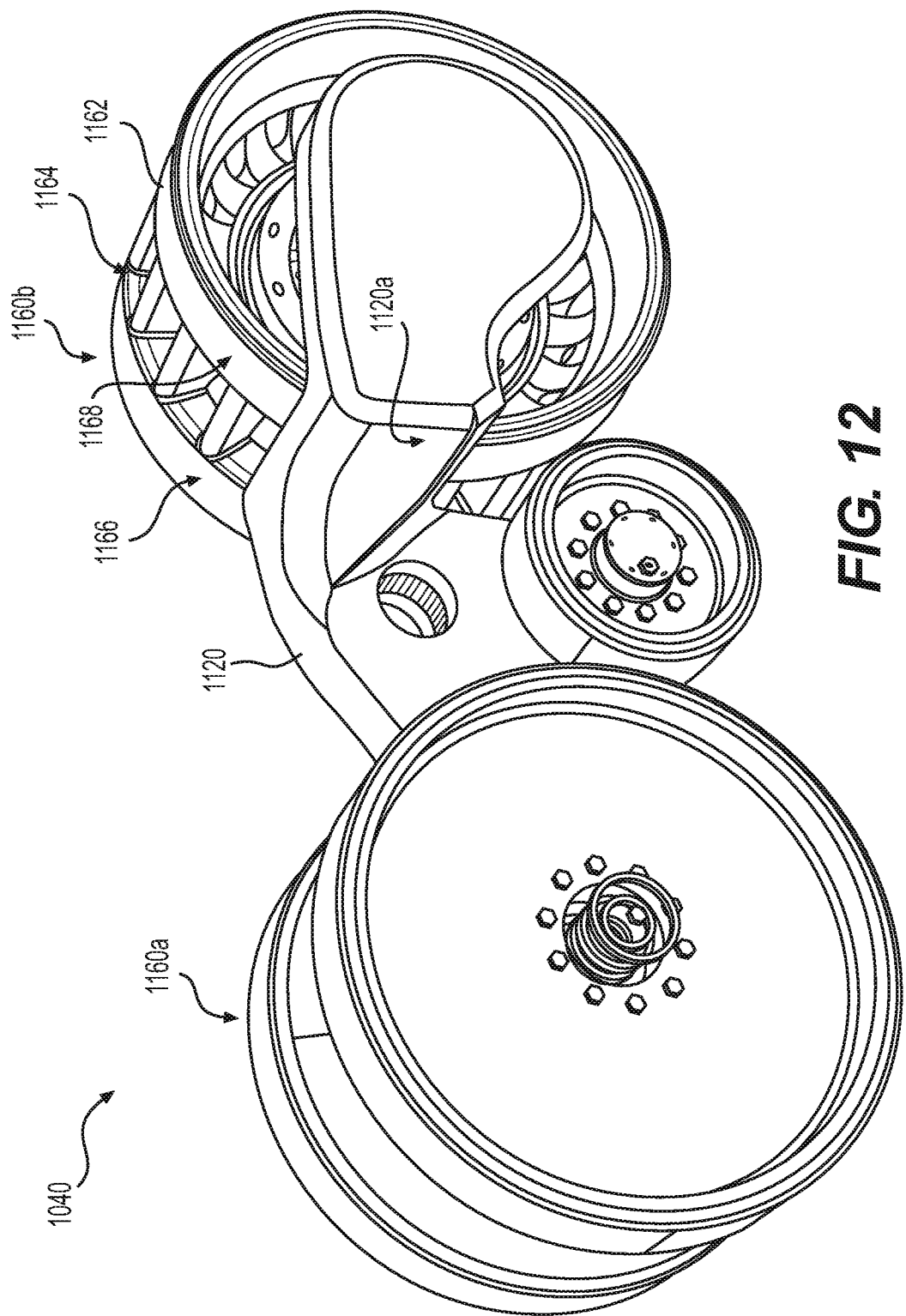
FIG. 12 is a perspective view taken from a top, front, left side of an alternative embodiment of the front right steerable track system of FIG. 1, shown with the endless track removed.

Now referring to FIGS. 12 and 13, yet another alternative embodiment of the steerable track system 40 is provided. The steerable track system 1040 is the same as the steerable track system 40, except insofar as it is described below.

The trailing support wheel assembly 1160b of the steerable track system 1040 has a single wheel 1162. The wheel 1162 is rotatably supported by the frame 1120 and connected to the output gear 1220 to be driven by the output gear 1220 in an analogous way to the way (described herein above) the output gear 220 is connected to the rear wheels 170l, 170r. In this embodiment, the wheel 1162 is a sprocket with apertures 1164 for receiving lugs of an endless track (not shown), for driving the endless track. The sprocket 1162 includes friction surfaces 1166, 1168 which frictionally drive the endless track.

For clarity, the frame 1120 of the steerable track system 1040 is not shown in FIG. 13 so as to show the gear train 1200. In this embodiment, the gear train 1200 includes the input gear 1210, the output gear 1220, and intermediate gears 1230a-d operatively connecting the input gear 1210 to the output gear 1220 for driving the output gear 1220.

The gear train 1200 of the steerable track system 1040 is selected to increase the torque that steerable track system 1040 transmits from the driven shaft 68 to the endless track. To this end, the input gear 1210 has fewer teeth than the output gear 1220. In other embodiments of the steerable track system 1040, the input gear 1210 has a greater number of teeth than the output gear 1220.

Similar to the cavity 140, the frame 1120 has a cavity (not shown) defined therein, which houses the input gear 1210, the output gear 1220, and the intermediate gears 1230a-d. As described herein above, the input gear 1210 is laterally offset from the output gear 1220, as shown with reference lines 1240 in FIG. 13. Accordingly, the frame 1120 and the cavity are shaped such that the cavity houses the gear train 1200, including the input gear 1210 and the output gear 1220.

Third Alternative Embodiment

Figure 14:
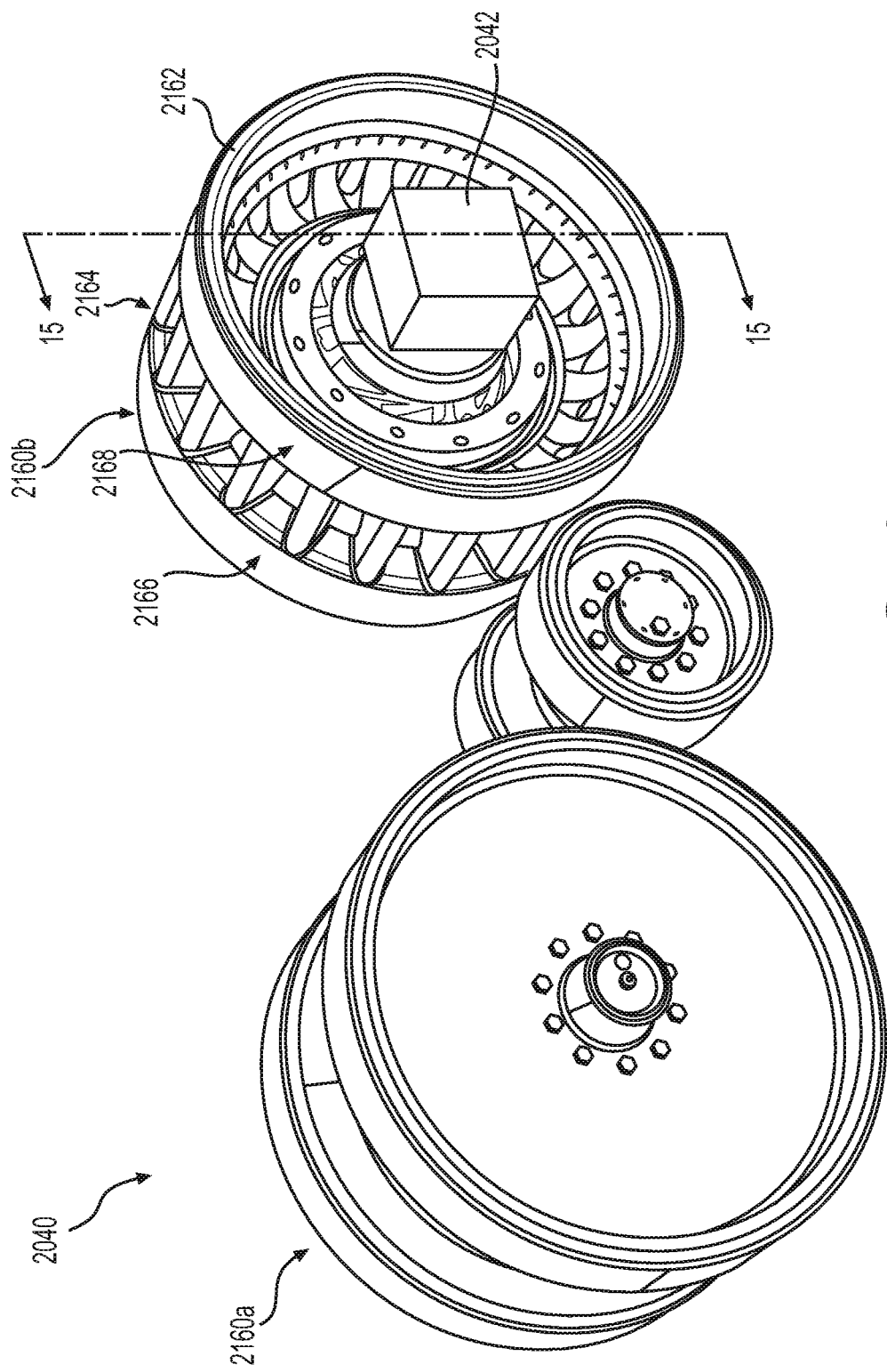
FIG. 14 is perspective view taken from a top, front, left side of another embodiment of the front right steerable track system of FIG. 1, shown with the frame and the endless track removed.
Figure 15:
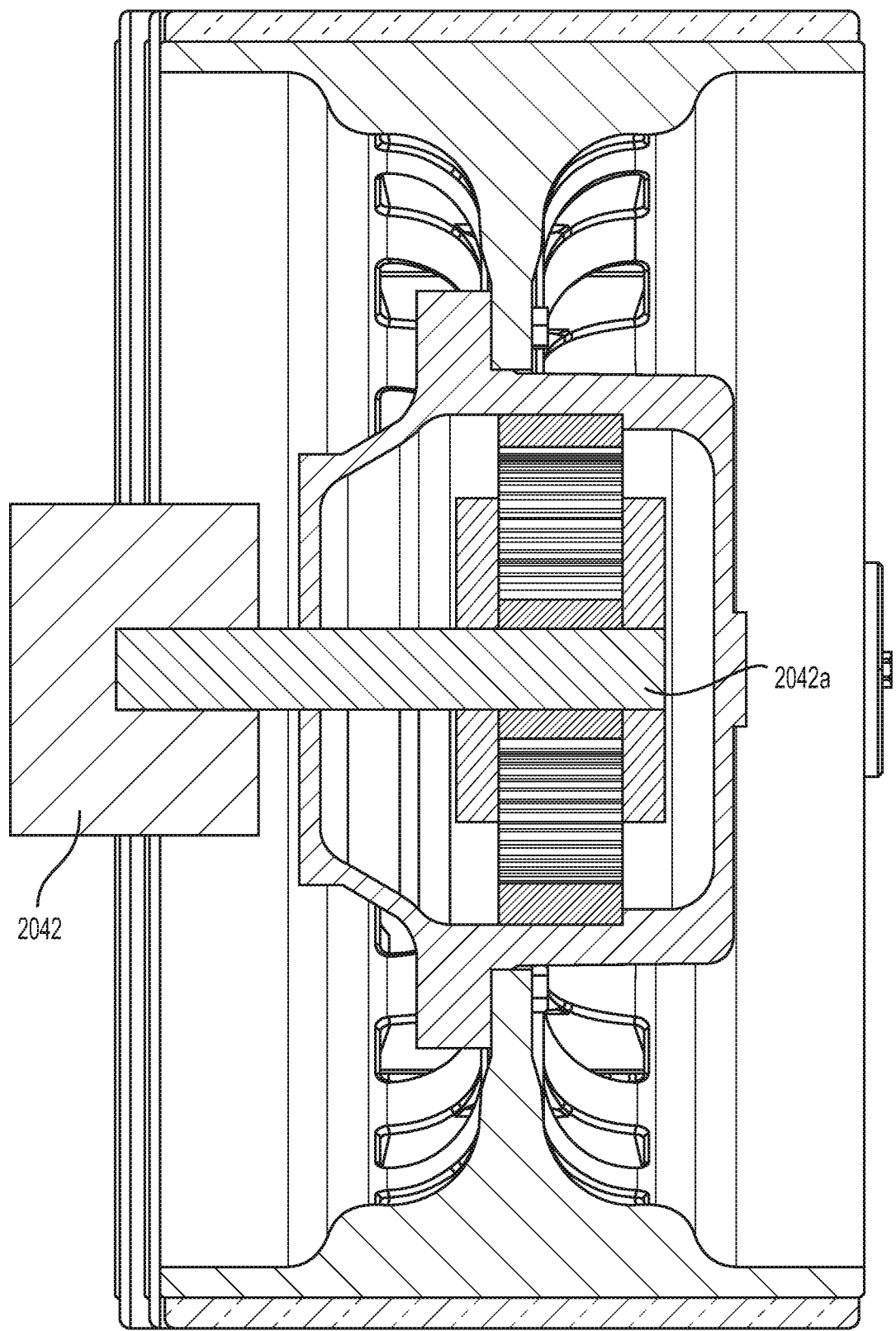
FIG. 15 is a cross-sectional view of the front right steerable track system of FIG. 14 taken along cross-section line 15-15 of FIG. 14.

Referring to FIGS. 14 and 15, a steerable track system 2040, which is yet another embodiment of the steerable track system 40, is provided. The steerable track system 2040 is the same as the steerable track system 40, except insofar as it is described below. To maintain clarity, the frame of the steerable track system 2040 is not shown in FIG. 14.

The trailing support wheel assembly 2160b of the steerable track system 2040 has a single wheel 2162. The wheel 2162 is a sprocket with apertures 2164 for receiving internally-facing lugs of an endless track (not shown) for driving the endless track. The sprocket 2162 includes friction surfaces 2166, 2168 which frictionally drive the endless track.

In this embodiment, the gear train 200 is omitted. Instead, in this embodiment, the steerable track system 2040 includes a motor 2042 that is operatively connected to the wheel 2162 via a shaft 2042a (FIG. 15).

In the present embodiment, the electric motor 2042 is mounted concentrically over the axle of the trailing track-supporting wheel assembly 2160b. The frame of the steerable track system 2040 does not have a cavity defined therein. It is contemplated that the frame of the steerable track system 2040 could have a cavity defined therein, similar to the cavity 140. It is contemplated that the motor 2042 could be housed within that cavity and could be operatively connected to the trailing track-supporting wheel assembly 2160b via a suitable drive train to drive the trailing track-supporting wheel assembly 2160b.

In this embodiment, the electric motor 2042 is electrically connected to and powered by a power source 100b (FIG. 2A) of the vehicle 60. The power source 100b is an electrical power generator 100b mounted to the chassis 62 and is operatively connected to the engine 60a of the vehicle 60 to be driven by the engine 60a.

It is contemplated that the electrical power generator 100b could include and/or be electrically connected to an electrical storage unit of the vehicle 60, such as a battery, for powering the electric motor 2042. The electrical systems of the vehicle 60, which include the electrical power generator 100b, the electric motor 2042, and the electrical connections are conventionally known and are therefore not described in any more detail herein.

It is contemplated that the motor 2042 could be a different type of motor. In one example, it is contemplated that the motor 2042 could be a hydraulic motor 2042 and the power source 100b of the vehicle 60 could be a hydraulic system for powering the hydraulic motor. In such an embodiment, the hydraulic motor 2042 would be operatively connected to the hydraulic system via suitable hydraulic conduits to be powered by the hydraulic system. Hydraulic systems and hydraulic motors are conventionally known and are therefore not described herein in any more detail.

Fourth Alternative Embodiment

Figure 16:
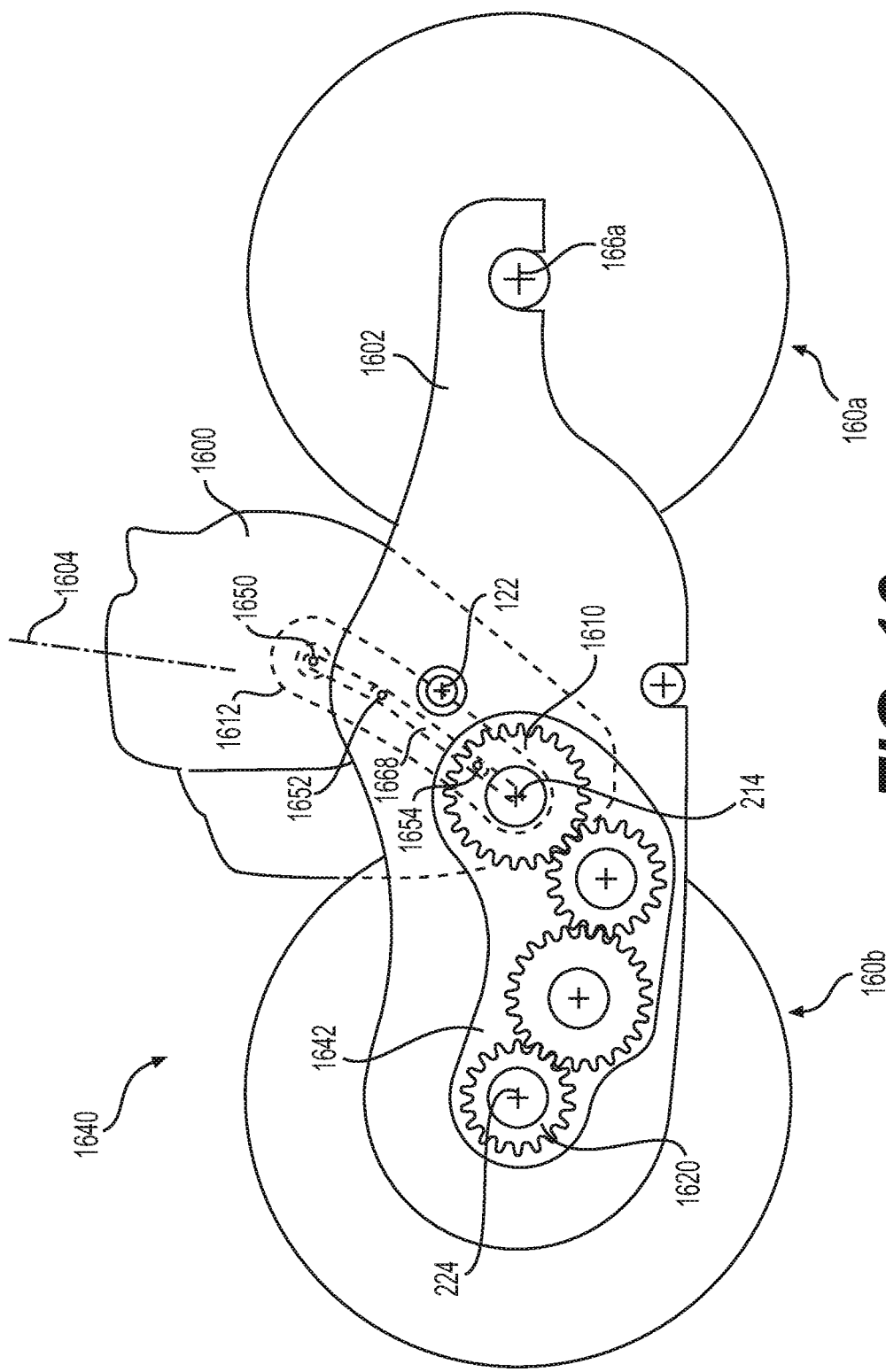
FIG. 16 is a cross-sectional view of another embodiment of the front right steerable track system of FIG. 5 taken along cross-section line 6-6 of FIG. 5.

Referring to FIG. 16, a steerable track system 1640, which is yet another embodiment of the steerable track system 40, is provided. The steerable track system 1640 is the same as the steerable track system 40, except insofar as it is described below.

In this embodiment, the input gear axis 214 is offset downwardly and rearward from the frame pivot axis 122. The input gear 1610 is operatively connected to the output gear 1620 via two intermediate gears 1680, 1682, and has a greater number of teeth than the output gear 1620.

The driven shaft 1668 (shown schematically in FIG. 16) is operatively connected to the input gear 1610 via three constant velocity joints 1650, 1652, 1654. The passageway 1612 in the steering knuckle 1600 is dimensioned so as to allow pivotal motion of the steering knuckle 1600 about the steering axis 1604, and such that the driven shaft 1668 does not contact the walls of the steering knuckle 1600 that define the passageway 1612 when the steering knuckle 1600 (and therefore also the frame 1602) pivots about the steering axis 1604. The present technology does not require a driven shaft to pass through a steering knuckle (for example, as is the case with the steering knuckle 1600 and the driven shaft 1668).

In this embodiment, the steering knuckle 1600 extends below the input gear axis 214. The cavity 1642 is smaller than the cavity 140 and does not extend to the pivot connection between the steering knuckle 1600 and the frame 1602.

Materials and Manufacturing

The various components of the steerable track system 40 are made of conventional materials (e.g., for structural components, metals and metal alloys in most cases, such as steel; for the endless track 280, an elastomeric material, such as rubber) via conventional manufacturing processes (e.g. casting, molding, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A steerable track system for use with a vehicle having a chassis, an axle frame extending laterally outwardly from the chassis and having an attachment portion at an end thereof to which the steerable track system is connectable, and a driven shaft extending laterally outwardly from the chassis suitable for driving the steerable track system, the steerable track system comprising:
   a frame having a cavity extending longitudinally therein and being operatively connectable to the axle frame so as to be pivotable about a steering axis for steering the track system;
   a gear train, the gear train including a plurality of gears, the plurality of gears including:
      an input gear mounted on an input shaft rotatable about an input gear axis, and
      an output gear longitudinally spaced apart from said input gear, the output gear being mounted on an output shaft longitudinally spaced apart from said input shaft, the output shaft being rotatable about an output gear axis,
   the input and output gears being disposed within the cavity, the input gear being operatively connected to the output gear to drive the output gear, and the input shaft being operatively connectable to the driven shaft of the vehicle;
   a plurality of track-supporting wheel assemblies rotatably mounted to the frame and including a driven wheel assembly, the driven wheel assembly being operatively connected to the output shaft; and
   an endless track extending around the plurality of track-supporting wheel assemblies and being drivable by the driven wheel assembly.

2. The steerable track system of claim 1, wherein the frame is operatively connectable to the axle frame so as to be pivotable about a frame pivot axis to allow for changes in a pitch of the track system when the track system is connected to the vehicle.

3. The steerable track system of claim 1, further comprising a steering knuckle connectable to tie rods of the vehicle; and wherein the frame is operatively connectable to the axle frame via the steering knuckle.

4. The steerable track system of claim 1, further comprising a powertrain assembly including the driven shaft, the input shaft, and at least one constant velocity joint assembly operatively connected therebetween; and
   wherein,
      the steering knuckle has a passageway defined therein,
      the powertrain assembly extends at least partially within the passageway in the steering knuckle, and
      the passageway is dimensioned to allow pivotal motion of the steering knuckle about the knuckle pivot axis notwithstanding a presence of the powertrain assembly extending therethrough.

5. The steerable track system of claim 2, wherein the plurality of track-supporting wheel assemblies rotate about corresponding track-supporting wheel axes, and the plurality of track supporting wheel axes lie in a first horizontal plane extending below the frame pivot axis.

6. The steerable track system of claim 2, wherein, when the steerable track system is connected to the vehicle, the frame pivot axis lies in a second horizontal plane extending below the axle frame of the vehicle.

7. The steerable track system of claim 1, further comprising a roller wheel assembly supported by the frame, the roller wheel assembly being disposed intermediate a leading track-supporting wheel assembly and a trailing track-supporting wheel assembly of the plurality of track-supporting wheel assemblies.

8. The steerable track system of claim 1, wherein the output gear has a first number of teeth and the input gear has a second number of teeth that is greater than the first number of teeth.

9. The steerable track system of claim 1, wherein the vehicle is designed to have a wheel assembly having a tire connected to the attachment portion of the axle frame; and wherein the input gear, the output gear, and the driven wheel assembly are dimensioned such that, for a given driven shaft rotational speed, a ground speed of the track is within a predetermined percentage of the ground speed of the tire.

10. The steerable track system of claim 9, wherein the predetermined percentage is between 0% and 30% inclusive.

11. The steerable track system of claim 2, wherein:
   the input gear axis is coaxial with the frame pivot axis and the output gear axis is coaxial with a trailing track-supporting wheel axis; and
   the input and output gears are coplanar in a vertical plane parallel to a longitudinal centerline of the frame.

12. The steerable track system of claim 1, wherein the endless track is at least in part frictionally driven by the driven wheel assembly.

13. The steerable track system of claim 1, further comprising a stop extending laterally from the frame, the stop being structured and arranged to limit pivotal movement of the frame about the frame pivot axis.

14. The steerable track system of claim 1, wherein the endless track has an obround travel path around the plurality of track-supporting wheel assemblies.

15. The steerable track system of claim 1, wherein an entirety of the gear train is below a plane tangential to an uppermost point of each surface of two of the plurality of track-supporting wheel assemblies.

16. The steerable track system of claim 15, wherein the entirety of the frame is below the tangential plane.

17. The steerable track system of claim 15, wherein the two track-supporting wheel assemblies have a same wheel diameter and are the leading and trailing track-supporting wheel assemblies.

18. A steerable track system for use with a vehicle having a chassis, a power source mounted to the chassis suitable for driving the steerable track system, and an axle frame extending laterally outwardly from the chassis and having an attachment portion at an end thereof to which the steerable track system is connectable, the steerable track system comprising:
   a frame being operatively connectable to the attachment portion so as to be pivotable about a steering axis for steering the track system;
   a motor supported by the frame and being operatively connectable to the power source of the vehicle, the motor having an output shaft;

a plurality of track-supporting wheel assemblies supported by the frame, each one of the plurality of track-supporting wheel assemblies having a track-supporting wheel axle about which that one of the plurality of track-supporting wheel assemblies rotates, at least one the track-supporting wheel assemblies being operatively connected to the output shaft of the motor to be driven by the motor; and an endless track extending around the plurality of track-supporting wheel assemblies.

19. The steerable track system of claim 18, wherein the power source is an electrical power source and the motor is an electric motor.

20. The steerable track system of claim 18, wherein the power source is a hydraulic system and the motor is a hydraulic motor.

21. The steerable track system of claim 18, wherein the frame has a cavity defined therein and the cavity houses the motor therein.

\* \* \* \* \*